(12) United States Patent
Asano

(10) Patent No.: US 7,359,153 B2
(45) Date of Patent: Apr. 15, 2008

(54) RECORDING MEDIUM CARTRIDGE

(75) Inventor: Katsuki Asano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 388 days.

(21) Appl. No.: 11/188,619

(22) Filed: Jul. 26, 2005

(65) Prior Publication Data
US 2006/0026623 A1 Feb. 2, 2006

(30) Foreign Application Priority Data
Jul. 28, 2004 (JP) ............................. 2004-220312
Jul. 30, 2004 (JP) ............................. 2004-224328

(51) Int. Cl.
*G11B 23/027* (2006.01)
(52) U.S. Cl. ..................... 360/132; 360/134
(58) Field of Classification Search ................ 360/132, 360/134; 720/729; 711/162; 242/348
See application file for complete search history.

(56) References Cited

U.S. PATENT DOCUMENTS 7,104,488 B2 * 9/2006 Hiraguchi ................... 242/348
7,111,135 B2 * 9/2006 Justo et al. .................. 711/162
7,123,444 B1 * 10/2006 Solhjell ....................... 360/132
7,227,721 B1 * 6/2007 Kientz et al. ............... 360/132
2001/0043436 A1 * 11/2001 Onmori et al. ............. 360/132
2004/0042122 A1 * 3/2004 Honda ........................ 360/132
2004/0107433 A1 * 6/2004 Izumida ...................... 720/729

FOREIGN PATENT DOCUMENTS

JP          08339652 A   * 12/1996
JP       A 2000-268443     9/2000
JP       A 2003-123342     4/2003

* cited by examiner

*Primary Examiner*—Tianjie Chen
(74) *Attorney, Agent, or Firm*—Margaret A. Burke; Sheldon J. Moss

(57) ABSTRACT

A recording tape cartridge is structured so as to accommodate, within a case, a reel on which is wound a magnetic tape which is a recording medium. The recording tape cartridge has a so-called WORM function such that overwriting of data on a recording region of the magnetic tape where data is already written, is prohibited. Within the case are provided a first memory board which stores data managing information for managing data written on the magnetic tape, and a second memory board which stores WORM managing information for managing writing of data to the magnetic tape.

8 Claims, 13 Drawing Sheets

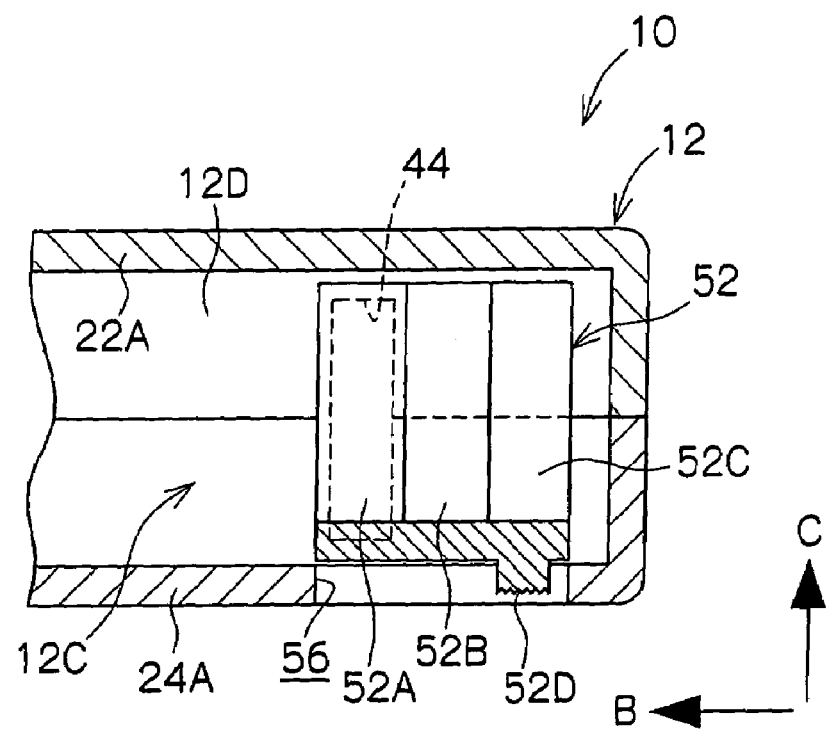
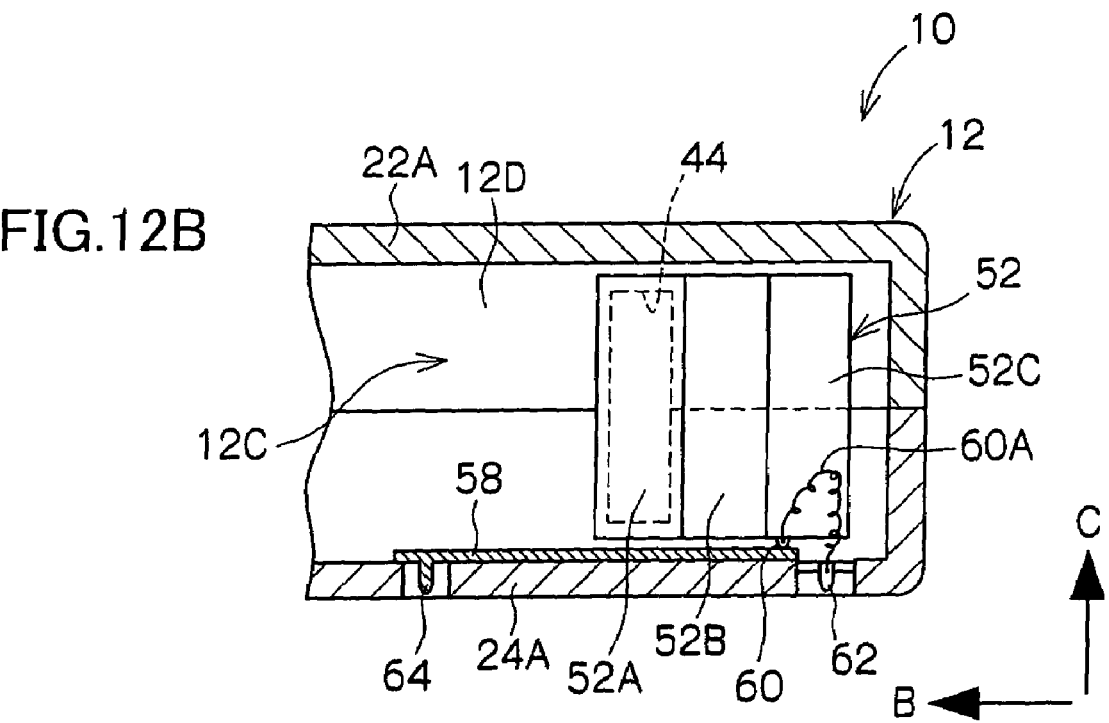

RECORDING MEDIUM CARTRIDGE

CROSS-REFERENCE TO RELATED APPLICATIONS

This application claims priority under 35 USC 119 from Japanese Patent Applications Nos. 2004-220312 and 2004-224328, the disclosures of which are incorporated by reference herein.

BACKGROUND OF THE INVENTION

1. Field of the Invention

The present invention relates to a recording medium cartridge which accommodates, within a case, a recording tape wound on a reel or a disc-shaped disk medium for example.

2. Description of the Related Art

Recording medium cartridges which accommodate, within a case, a recording tape wound on a reel or a disc-shaped disk medium for example, are known as external recording media for computers and the like. Such a recording medium cartridge has been thought of which has a so-called WORM function in which the writing of data is allowed one time, writing of data onto storage regions where data is written is prohibited, and thereafter, the recording medium is used as an additional-write or a read-only recording medium (see, for example, Japanese Patent Application Laid-Open (JP-A) Nos. 2003-123342 and 2000-268443). In the recording tape cartridges disclosed in these publications and having a magnetic tape as the recording medium thereof, a cartridge memory (CM) provided within the cartridge case in used in order to realize the WORM function. For example, the CM stores information for managing the data recorded on the magnetic tape, such as the tape format, the serial number, the error rate, and the like, as well as information for realizing the WORM function, such as the fact that the cartridge is a WORM-type cartridge. Accordingly, a drive into which this recording tape cartridge is loaded can recognize that the recording tape cartridge is a WORM-type cartridge.

However, in conventional recording medium cartridges such as described above, the information for data management and the information for the WORM function are stored in a single memory device, and therefore, these information are stored in the same storage format. Thus, it is difficult to aim for improvement of the security of WORM-type recording media at which, generally, important data is recorded.

Further, in managing a WORM-type recording medium cartridge such as described above, it is convenient to judge the absence/presence of writing of data on the recording medium and the absence/presence of the reading history. However, in a conventional recording tape cartridge, merely due to the information relating to the WORM function being stored in the CM as described above, the user cannot directly obtain the information relating to the WORM function without loading the recording medium cartridge into a drive device or the like. Further, it is preferable to have a drive device recognize the information relating to the WORM without using an expensive CM, and, from the standpoint of ensuring security, to handle to the information relating to the WORM separately from the CM which stores the aforementioned information for data management.

SUMMARY OF THE INVENTION

In view of the aforementioned, an object of the present invention is to provide a recording medium cartridge which can improve the maintainability of data recorded on a recording medium.

Another object of the present invention is to provide a WORM-type recording medium cartridge in which the absence/presence of writing of data on the recording medium and the absence/presence of a history of reading the data can be recognized by a user or a recording medium handling device.

In order to achieve the above-described objects, a recording medium cartridge of a first aspect of the present invention is a recording medium cartridge accommodating a recording medium within a case, and preventing data from being overwritten onto a recording region of the recording medium where data is already written, the recording medium cartridge including: a first memory device provided within the case and storing information for managing the data written at the recording medium; and a second memory device provided within the case and storing information for managing writing of data to the recording medium.

The recording medium cartridge of the first aspect of the present invention is structured such that a recording medium and first and second memory devices are accommodated within a case, and so as to have a so-called WORM function such that data cannot be overwritten in recording regions of the recording medium where data is already written. In this recording medium cartridge, the first memory device stores information for managing the data written on the recording medium, such as, for example, the data format, error information, or the like. On the other hand, in order to realize the WORM function, the second memory device stores information (hereinafter called "WORM managing information") for managing the writing of data or constraints on the writing of data to the recording medium, such as, for example, the fact that this is a WORM-type recording medium cartridge, the regions of the recording medium where data is already stored, and the like.

In order to rewrite data which is written (recorded) on the recording medium, the WORM managing information stored in the second memory device must be changed. Namely, for example, when the recording medium cartridge is not a WORM-type cartridge, the drive device is made to recognize that fact. Or, when the recording medium cartridge is a WORM-type cartridge but writing of information to recording regions which are to be rewritten is not carried out. Thus, a person maliciously altering the data will change the WORM managing information of the second memory device so as to make the drive device recognize it.

Here, the second memory device, which stores the WORM managing information, is structured as a device which is separate from the first memory device. Therefore, the second memory device can be set to a higher level of security than the first memory device. Namely, for example, altering of the WORM managing information can be made to be difficult by making the writing method of the second memory device be a different method than the writing method of the first memory device and requiring a special driver to rewrite information.

In this way, in the recording medium cartridge of the first aspect of the present invention, the maintainability of the data recorded on the recording medium can be improved. Note that it suffices for the first and second memory devices to be able to make a drive device recognize at least the aforementioned data managing information and WORM managing information stored therein, and it is not a necessary condition that information be newly written to the first and second memory devices.

A recording medium cartridge of a second aspect of the present invention is structured such that, in the recording medium cartridge of the first aspect, the first memory device and the second memory device carry out reading or writing of information by non-contact-type communication processing with a memory reading portion or memory writing portion of a drive device, and the first memory device and the second memory device are disposed at different corner portions within the case.

In the recording medium cartridge of the second aspect of the present invention, the first and second memory devices carry out communications in a non-contact manner (wirelessly) with a corresponding memory reading means or memory writing means of a drive device, respectively, such that reading or writing of their respective information is carried out. Here, because the first memory device and the second memory device are disposed at different corner portions of the case, i.e., because the two memory devices are disposed so as to be separated from one another, it is possible to prevent their communications from crossing.

A recording medium cartridge of a third aspect of the present invention is structured such that, in the recording medium cartridge of the first aspect, the first memory device and the second memory device carry out reading or writing of information by non-contact-type communication processing with a memory reading portion or memory writing portion of a drive device, and a direction of communication of the first memory device and a direction of communication of the second memory device are different directions.

In the recording medium cartridge of the third aspect of the present invention, the first and second memory devices carry out communications in a non-contact manner (wirelessly) with a corresponding memory reading means or memory writing means of a drive device, respectively, such that reading or writing of their respective information is carried out. Here, the direction of communication of the first memory device with the corresponding memory reading means or memory writing means, and the direction of communication of the second memory device with the corresponding memory reading means or memory writing means, are respectively different directions. Therefore, it is possible to prevent their communications from crossing.

A recording medium cartridge of a fourth aspect of the present invention is structured such that, in the recording medium cartridge of the first aspect, one of the first memory device and the second memory device carries out reading or writing of information by communication processing carried out by electrical contact with a memory reading portion or a memory writing portion of a drive device.

In the recording medium cartridge of the fourth aspect of the present invention, either one of the first and second memory devices is a contact-type memory device, and carries out communication while contacting the memory reading means or the memory writing means of the drive device. Reading or writing of information is thereby carried out. Here, because one of the first and second memory devices is a contact-type memory device, even if the other is a non-contact-type memory device, it is possible to prevent their communications from crossing. Therefore, the degrees of freedom in placement of the first and second memory devices are high. Further, contact-type memory devices can be structured less expensively than non-contact-type memory devices, and the WORM function can be structured at a low cost.

A recording medium cartridge of a fifth aspect of the present invention is structured such that, in the recording medium cartridge of the first aspect, the second memory device is destroyed when the case is disassembled.

In the recording medium cartridge of the fifth aspect, if the case is disassembled in order to remove the second memory device within the case in order to tamper with the data recorded at the recording medium, the second memory device is destroyed. Due to this destruction, it is impossible for a drive device to read the WORM managing information stored in the second memory device. Therefore, if the drive device is set so as to not write data onto a recording medium if WORM managing information is not inputted, the data written at the recording medium is prevented from being tampered with. Note that it is preferable to set the present recording medium cartridge such that data is not written to the recording medium at a drive device which does not have a reading means which reads the information of the second memory device.

A recording medium cartridge of a sixth aspect of the present invention is a recording medium cartridge accommodating a recording medium within a case, and preventing data from being overwritten onto a recording region of the recording medium where data is already written, the recording medium cartridge comprising: a medium state indicating deice; and a switching mechanism that, in accordance with a relative position of a member with respect to the case, switches the medium state indicating deice the among: a first state corresponding to the recording medium being unused, a second state corresponding to data being written on the recording medium and there not being a reading history of the data, and a third state corresponding to data written on the recording medium having a reading history, such that the state can be recognized by a user or a recording medium handling device.

The recording medium cartridge of the sixth aspect of the present invention is structured such that the recording medium and the switching mechanism are respectively provided within the case, and so as to have a so-called WORM function such that data cannot be overwritten at recording regions where data is already written on the recording medium. In a case in which the recording medium is unused, i.e., in a state in which data is not written on the recording medium, the member of the switching mechanism is positioned at an initial position with respect to the case so as to allow a user or a recording medium handling device to recognize that it is the first state. When data is written to the recording medium, the switching mechanism displaces the member from its initial position, and positions the member at a position with respect to the case such that the user or the recording medium handling device can be made to recognize that it is the second state. When data written on the recording medium is read, the switching mechanism displaces the member further and positions the member at a position with respect to the case such that the user or the recording medium handling device can be made to recognize that it is the third state.

In this way, in accordance with the position of the member relative to the case, the user or the recording medium handling device can recognize which state among the first state, the second state, and the third state the switching mechanism is in, i.e., whether or not data is written on the recording medium, and, if data is written, whether or not the data has a history of being read. Note that the recording medium handling device is considered to include, in addition to a writing device (drive device) which writes data on the recording medium and a reading device (drive device)

which reads data written on the recording medium, devices such as, for example, a library device which automatically loads into a drive device and recovers from a drive device a large number of stocked recording medium cartridges, or the like. Further, displacement of the member is not limited to rectilinear displacement, and may be angular displacement, or displacement in the form of a curve other than a circular arc.

In this way, the recording medium cartridge of the sixth aspect of the present invention can make a user or a recording medium handling device recognize that the cartridge is a WORM-type cartridge, and the absence/presence of writing of data on the recording medium, and the absence/presence of a reading history of the data. Note that the present invention is not limited to a structure in which the state of one member is varied in three stages. For example, the user or the recording medium handling device may be made to recognize the first through the third states by two members switching states in two stages (digitally).

A recording medium cartridge of a seventh aspect of the present invention is structured such that, in the recording medium cartridge of the sixth aspect, the member is displaced by a drive device used for writing data on the recording medium to switch the medium state indicating device is switched from the first state to the second state, and the member is displaced by a drive device used for reading data written on the recording medium to switch the medium state indicating device is switched from the second state to the third state.

In the recording medium cartridge of the seventh aspect of the present invention, a drive device which writes data to the recording medium displaces the member from its initial position to a position corresponding to the second state, before the writing or during the writing or after the writing. Further, the drive device which reads the data written on the recording medium displaces the member from the position corresponding to the second state to the position corresponding to the third state, before the reading or during the reading or after the reading. Therefore, the state that the switching mechanism indicates to the user or the recording medium handling device, and the absence/presence of writing of data on the recording medium and the absence/presence of a history of reading the data, can reliably coincide with one another.

A recording medium cartridge of an eighth aspect of the present invention is structured such that, in the recording medium cartridge of the sixth aspect, the member has a first indicating portion, a second indicating portion, and a third indicating portion having respectively different colors, and at a time of the first state, only the first indicating portion is exposed from the case, and at a time of the second state, only the second indicating portion is exposed from the case, and at a time of the third state, only the third indicating portion is exposed from the case.

In the recording medium cartridge of the eighth aspect of the present invention, the user or the recording medium handling device (mainly the user), that confirms the color of the first indicating portion of the member from (an indication window or the like provided in) the case, can recognize that the recording medium is unused. Further, the user or the like who confirms the color of the second indicating portion of the member from the case can recognize that data is written on the recording medium but there is no reading history. Moreover, the user or the like who confirms the color of the third indicating portion of the member from the case can recognize that data is written on the recording medium and that that data has a reading history. In this way, mainly the user can easily recognize the state of the recording medium. In addition, a plurality of recording medium cartridges can be easily classified or the like per the state of the recording medium.

A recording medium cartridge of a ninth aspect of the present invention is structured such that, in the recording medium cartridge of the sixth aspect, due to a medium state indicating device varying, as the first state, the second state, or the third state and in accordance with the position of the member with respect to the case, an electrical resistance between the case and the member which changes, the medium state indicating device makes the medium handling device, which detects the electrical resistance, recognize which state among the first state, the second state and the third state the recording medium cartridge is in.

In the recording medium cartridge of the ninth aspect of the present invention, for example, when conductive bodies are provided slidingly with respect to one another at the case and the member respectively, the electrical resistance between the terminal of the conductive body at the member and the terminal of the conductive body at the case varies in accordance with the position of the member with respect to the case. In this way, by varying the electrical resistance as the first state, the second state, and the third state in accordance with the position of the member, a recording medium handling device which detects this electrical resistance can recognize the state of the recording medium.

A recording medium cartridge of a tenth aspect of the present invention is a recording medium cartridge accommodating a recording medium within a case, and preventing data from being overwritten onto a recording region of the recording medium where data is already written, the recording medium cartridge comprising: a first indicating portion provided so as to be exposed to an exterior of the case, a state of the first indicating portion changing, so as to be able to be recognized by a user or a recording medium handling device, when data is written to the recording medium which is unused; and a second indicating portion provided so as to be exposed to an exterior of the case, a state of the second indicating portion changing, so as to be able to be recognized by a user or a recording medium handling device, when data written on the recording medium is read initially.

In the recording medium cartridge of the tenth aspect of the present invention, the first indicating portion and the second indicating portion are exposed to the exterior of the case which accommodates the recording medium, and the recording medium cartridge has a so-called WORM function such that data is not overwritten at recording regions of the recording medium where data is already written. When the recording medium is unused, i.e., in a state in which data is not written on the recording medium, the first and second indicating portions are both in initial state. When data is written to the recording medium, the state of the first indicating portion changes, and this can be recognized by a user or a recording medium handling device. Accordingly, in accordance with the state of the first indicating portion, the user or the recording medium handling device can recognize the absence/presence of writing of data on the recording medium. When data written on the recording medium is read, the state of the second indicating portion changes, and this can be recognized by a user or a recording medium handling device. Accordingly, in accordance with the state of the second indicating portion, the user or the recording medium handling device can recognize whether there is or is not a reading history of data written on the recording medium. Namely, in the present recording medium cartridge, the state of the recording medium is indicated digitally by a plurality of indicating portions assuming either one state of the two states that they can assume.

In this way, the recording medium cartridge of the tenth aspect of the present invention is a WORM-type cartridge, and can make a user or a recording medium handling device recognize the absence/presence of writing of data on the recording medium and the absence/presence of a reading history of the data. Note that the recording medium handling device is considered to include, in addition to a writing device (drive device) which writes data on the recording medium and a reading device (drive device) which reads data written on the recording medium, devices such as, for example, a library device which automatically loads into a drive device and recovers from a drive device a large number of stocked recording medium cartridges, or the like. Further, displacement of the member is not limited to rectilinear displacement, and may be angular displacement, or displacement in the form of a curve other than a circular arc.

A recording medium cartridge relating to an eleventh aspect of the present invention is structured such that, in the tenth aspect, the first indicating portion and the second indicating portion are each structured of a material whose color changes irreversibly when heated by a drive device.

In the recording medium cartridge of the eleventh aspect of the present invention, when a drive device which writes data to the recording medium heats the first indicating portion, the color of the first indicating portion changes irreversibly. Similarly, when a drive device which reads the data of the recording medium heats the second indicating portion, the color of the second indicating portion changes irreversibly. In this way, the states of the first and second indicating portions can be changed in a non-contact manner. Further, by using a structure in which the light transmittances change together with the colors before and after the heating of the first indicating portion and the second indicating portion, the state of the recording medium can be easily recognized by a drive device as well.

As described above, the recording medium cartridge relating to the present invention can improve the maintainability of data recorded on a recording medium.

Further, the recording medium cartridge relating to the present invention is a WORM-type cartridge, and has the excellent effect of making a user or a recording medium handling device recognize the absence/presence of writing of data on the recording medium and the absence/presence of a reading history of the data.

BRIEF DESCRIPTION OF THE DRAWINGS

FIG. 12A is a sectional view showing main portions of the recording tape cartridge relating to the fifth embodiment of the present invention, and showing an operational structure of a switching member.

FIG. 12B is a sectional view showing main portions of the recording tape cartridge relating to the fifth embodiment of the present invention, and showing an electrical resistance varying structure by the switching member.

DETAILED DESCRIPTION OF THE INVENTION

A recording tape cartridge 10, which serves as a recording medium cartridge relating to a first embodiment of the present invention, will be described on the basis of FIGS. 1 through 3. Note that, for convenience of explanation, the direction of loading the recording tape cartridge 10 into a drive device, which direction is indicated by arrow A, is the front direction (the front side) of the recording tape cartridge 10, and the directions of arrow B and arrow C, which are orthogonal to the direction of arrow A, are the right direction and the top direction, respectively.

Figure 1:
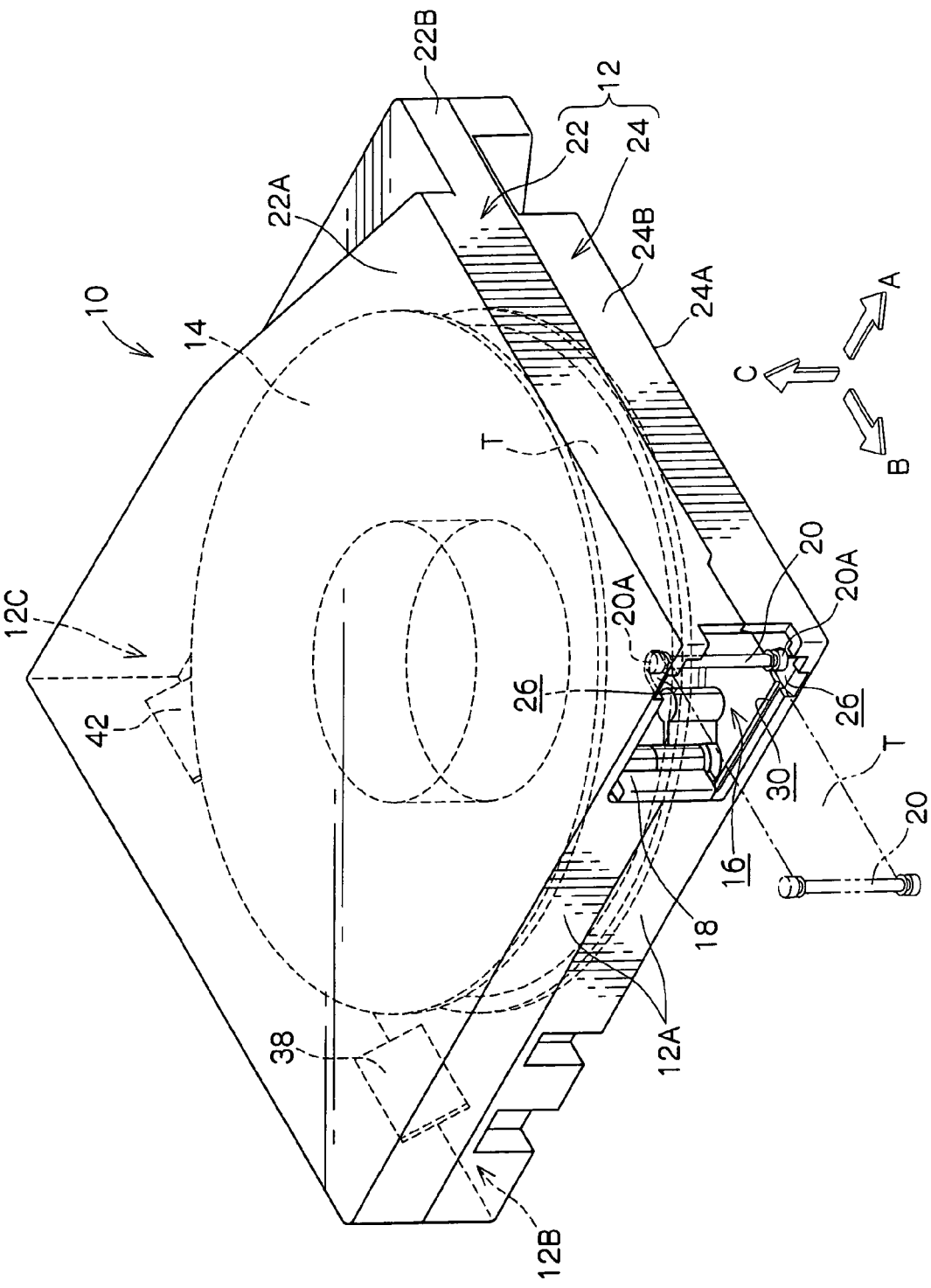
FIG. 1 is a perspective view showing the overall structure of a recording tape cartridge relating to a first embodiment of the present invention.
Figure 2:
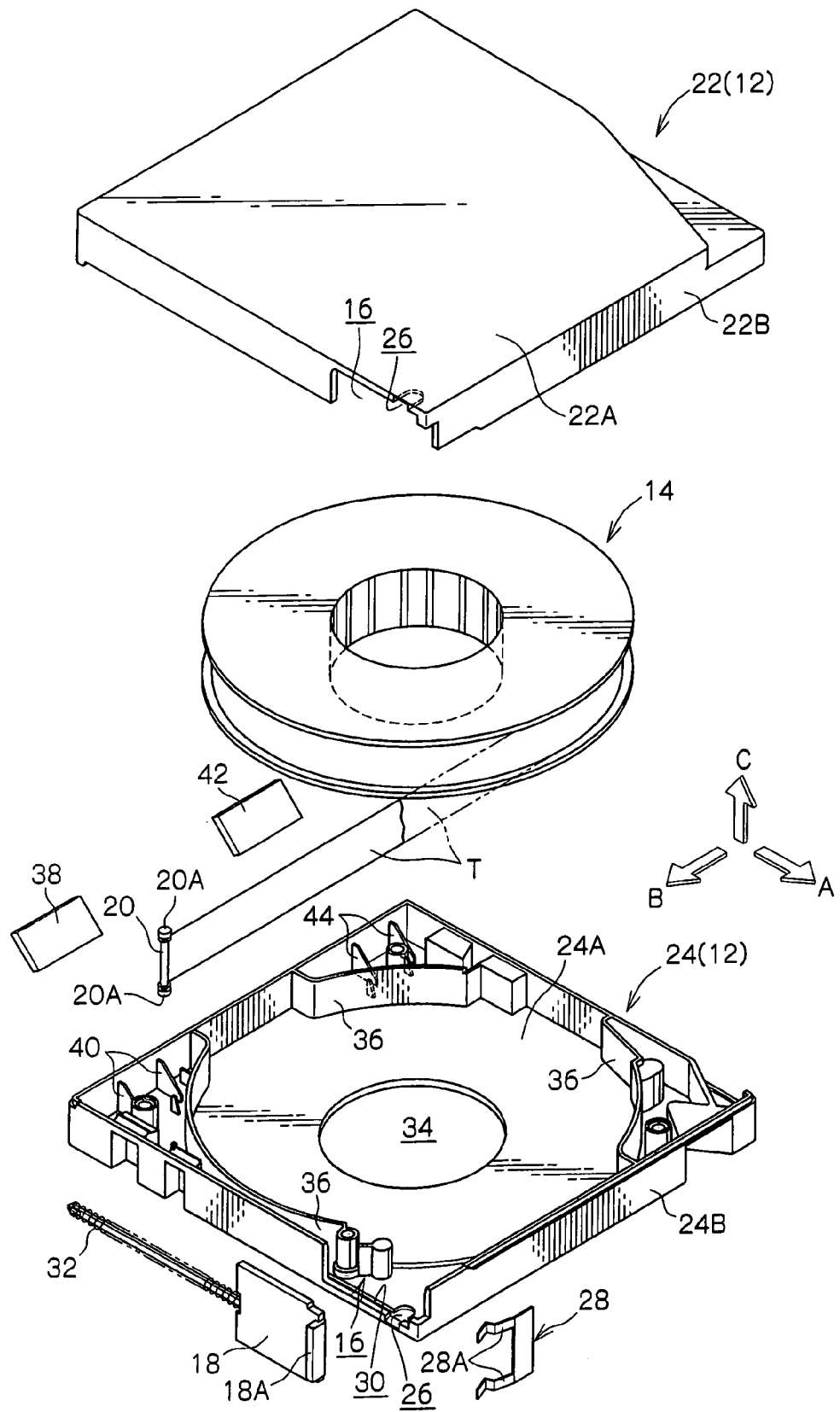
FIG. 2 is an exploded perspective view of the recording tape cartridge relating to the first embodiment of the present invention.
Figure 3:
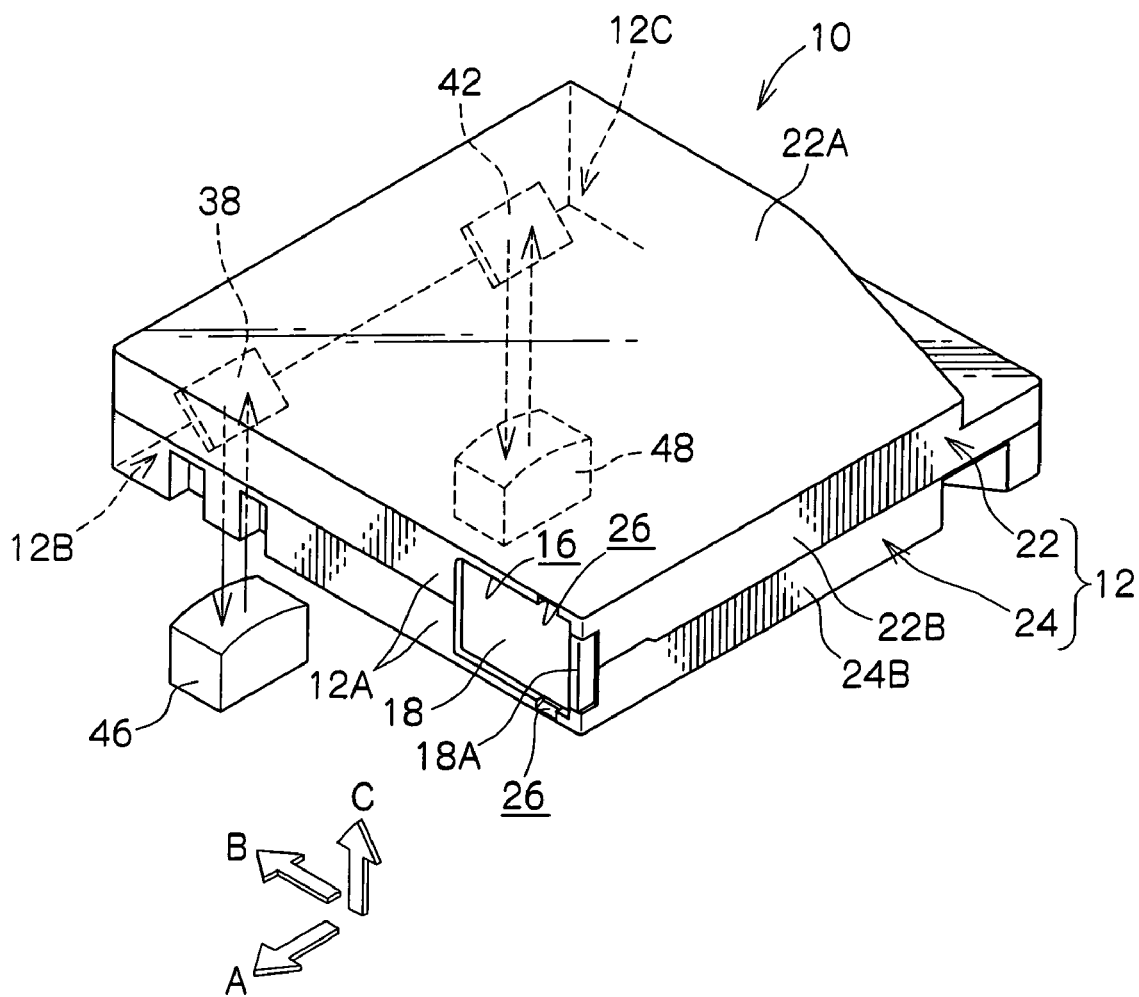
FIG. 3 is a perspective view schematically illustrating a state of communication, with a drive device, of the recording tape cartridge relating to the first embodiment of the present invention.

The overall structure of the recording tape cartridge 10 is illustrated in perspective view in FIG. 1, and a schematic exploded perspective view of the recording tape cartridge 10 is shown in FIG. 2. As shown in these figures, the recording tape cartridge 10 is structured so as to rotatably accommodate, within a case 12 which is substantially rectangular in plan view, a single reel 14 on which is wound a magnetic tape T serving as a recording medium which is an information recording/playback medium.

An opening 16, which is for the pulling-out of the magnetic tape T to the exterior of the case 12, is formed in the front end portion of the right side wall of the case 12. When the recording tape cartridge 10 (the magnetic tape T) is not being used, the opening 16 is closed by a door 18. At times of use of the recording tape cartridge 10, the opening 16 is opened within a drive device. Further, a leader pin 20, which is a leader member, is attached to the distal end of the magnetic tape T. The leader pin 20 is formed as a small, solid cylinder. Flange portions 20A, which are provided at the longitudinal direction both ends of the leader pin 20 and project further upward and downward than the transverse direction end portions of the magnetic tape T, are caught by a pull-out member of the drive device, and the magnetic tape T is pulled-out from the case 12.

The case 12 is structured by joining an upper case 22 and a lower case 24 together. The upper case 22 is structured by a substantially frame-shaped peripheral wall 22B standing erect along the outer edge of a ceiling plate 22A which is substantially rectangular in plan view. The lower case 24 is structured by a peripheral wall 24B standing erect along the outer edge of a floor plate 24A of a configuration substantially corresponding to that of the ceiling plate 22A. The case 12 is formed substantially in the shape of a box by the upper case 22 and the lower case 24 being joined together by ultrasonic welding or screws or the like, in a state in which the open end of the peripheral wall 22B and the open end of the peripheral wall 24B abut one another.

The opening 16 is formed to be substantially rectangular in side view, and opens toward the right at the front end of a right side wall 12A, which runs along the direction of arrow A, of the case 12. (The right side wall 12A is the wall of the case 12 which faces toward the right and is structured by the peripheral wall 22B and the peripheral wall 24B.) Pin receiving recesses 26, which accommodate the flange portions 20A of the leader pin 20 standing upright thereat, are provided at the ceiling plate 22A and the floor plate 24A. The pin receiving recesses 26 open also toward the right in a vicinity of the front end of the opening 16, such that the leader pin 20 can enter in and exit from the case 12 through the opening 16. Further, a plate spring 28 is attached in a vicinity of the front end of the case 12, and a pair of upper and lower arms 28A are provided at the plate spring 28. The distal ends of the arms 28A of the plate spring 28 engage with the flange portions 20A of the leader pin 20, and hold the leader pin 20 with respect to the case 12. This held state is cancelled by the leader pin 20 being pulled to the right by a force of a predetermined value or more.

The door 18 which opens and closes the opening 16 is formed substantially in the shape of a rectangular, flat plate which alone can close the opening 16. The top and bottom end portions of the door 18 are slidingly disposed within guide grooves 30 which are provided in the ceiling plate 22A and the floor plate 24A along the open surface of the opening 16 and the right side wall 12A. In this way, due to the door 18 sliding in the front-back direction while being guided by the guide grooves 30, the door 18 can be selectively disposed at a closed position at which the door 18 closes the opening 16, and an open position at which the door 18 opens the opening 16. The door 18 is urged toward the front by a coil spring 32 which is an urging member provided between the door 18 and the case 12, and is usually positioned at the closed position due to this urging force. An operation portion 18A is provided at the front end of the door 18 so as to jut out toward the right. Due to this operation portion 18A being pushed rearward, the door 18 can move to the open position against the urging force of the coil spring 32.

A gear opening 34, which is for exposing a reel gear (not shown) of the reel 14, is provided in the central portion of the floor plate 24A of the case 12. The reel 14 is driven to rotate in a non-contact manner within the case 12, due to the rotation of a driving gear of a drive device which is meshed-together with the reel gear. When the magnetic tape T is not being used, rotation of the reel 14 with respect to the case 12 is impeded by a locking mechanism (not shown). This rotation impeded state is cancelled as the reel gear and the driving gear mesh-together. Further, a play restricting wall 36, which stands erect at portions of the ceiling plate 22A and the floor plate 24A along a circumference which is coaxial with the gear opening 24 and which is structured by top and bottom ends being set to oppose one another, is provided at the case 12. This play restricting wall 36 suppresses joggling of the reel 14, and the end portions thereof are continuous with the peripheral walls 22B, 24B so as to prevent the entry of dust and the like into the region where the reel 14 is set.

The above-described recording tape cartridge 10 is structured as a so-called WORM-type recording cartridge in which data is not overwritten in recording regions where data is already written (data is already recorded) at the magnetic tape T, i.e., functions as an additional-write or read-only recording medium cartridge after data has been recorded once on the magnetic tape. Details will be described hereinafter.

The recording tape cartridge 10 has a memory board (cartridge memory) 38. The memory board 38 is structured so as to have, at the surface of the substrate, an antenna which serves as a communication portion, and so as to have, at the reverse surface of the substrate, an IC chip serving as a memory portion (none of these are illustrated). The memory board 38 stores, at the IC chip, data managing information for managing the data recorded on the magnetic tape T, such as, for example, the tape format of the magnetic tape T, calibration information, the place where the final information is written, and the like. The memory board 38 communicates with the drive device by the antenna portion, such that the data managing information is read or updated.

The first memory board 38 is disposed at a corner portion 12B, which is at the right rear portion of the case 12 and is enclosed by the peripheral walls 22B, 24B and the play restricting wall 36. Concretely, a pair of left and right memory supporting ribs 40 stand erect at the corner portion 12B of the case 12 so as to extend between the top surface of the floor plate 24A and the inner surface of the rear side peripheral wall 24B. At each of the memory supporting ribs 40, the top edge which is the supporting surface is inclined forward at a predetermined angle (45° in the present first embodiment). The first memory board 38 is held at the case 12 by being nipped between the inclined, supporting surfaces of the memory supporting ribs 40 and a presser rib (not shown) which projects from the upper case 22.

In this state, the antenna side of the first memory board 38 is oriented rearward and downward, and can communicate rearward and downward in a non-contact state. In this way, as shown in FIG. 3, the first memory board 38 is structured so as to, with respect to a reading/writing device 46 positioned beneath the case 12 within a drive device for example, carry out communications downwardly in a non-contact manner such that information can be read by the drive device or information can be written (including updated) by the drive device. Further, with respect to a reading device (not illustrated) which accesses the first memory board 38 from the rear of the case 12 at a library device for example, the memory board 38 can carry out communications rearward in a non-contact manner such that the library device can read information.

Data managing information for managing the data recorded at the magnetic tape T, including, for example, the data format of the magnetic tape T, calibration information, the place where final information is written, the number of times of loading into a drive device, and the like, are stored in advance in the first memory board 38, or the stored information is updated as needed. Further, in addition to the aforementioned data managing information, write prohibiting information is stored at the first memory board 38. By making a drive device read this write prohibiting information or making a library device read the write prohibiting information before loading the cartridge into a drive device, the writing of data to and the erasure of data from the magnetic tape T are prohibited. In this way, in a case in which the present recording tape cartridge 10 is loaded into a drive device which does not correspond to the WORM function of the recording tape cartridge 10, recording of data onto the magnetic tape T is not carried out at all. Note that, other than storing the write prohibiting information, the first memory board 38 has the same structure (the same settings) as a memory board of a usual recording tape cartridge not having a WORM function.

The recording tape cartridge 10 has a second memory board 42 serving as a second memory device. The second memory board 42 is structured so as to have, at the surface of the substrate, an antenna which serves as a communication portion, and so as to have, at the reverse surface of the substrate, an IC chip serving as a memory portion (none of these are illustrated). The second memory board 42 is disposed at a corner portion 12C, which is at the left rear portion of the case 12 and is enclosed by the peripheral walls 22B, 24B and the play restricting wall 36. Concretely, a pair of left and right memory supporting ribs 44 stand erect at the left rear corner portion 12C of the case 12 so as to extend between the top surface of the floor plate 24A and the inner surface of the rear side peripheral wall 24B. At each of the memory supporting ribs 44, the top edge which structures the supporting surface is inclined forward at a predetermined angle (45° in the present first embodiment). The second memory board 42 is held at the case 12 by being nipped between the inclined, supporting surfaces of the memory supporting ribs 44 and a presser rib (not shown) which projects from the upper case 22.

In this state, the antenna side of the second memory board 42 is oriented rearward and downward, and can communicate rearward and downward in a non-contact state. In this way, as shown in FIG. 3, the second memory board 42 is structured so as to, with respect to a reading/writing device 48 positioned beneath the case 12 within a drive device for example, carry out communications downwardly in a non-contact manner such that information can be read by the drive device or information can be written (including updated) by the drive device. Further, with respect to a reading device (not illustrated) which accesses the second memory board 42 from the rear of the case 12 at a library device for example, the second memory board 42 can carry out communications rearward in a non-contact manner such that the library device can read information.

A distance of separation between the second memory board 42 and the first memory board 38, which are disposed at the different corner portions 12C, 12B of the case 12, is ensured, which distance of separation is sufficiently larger than the electric wave irradiation distance (communication distance) of the reading/writing device 46 which communicates with the first memory board 38 and the electric wave irradiation distance of the reading/writing device 48 which communicates with the second memory board 42. The corner portion 12C is a portion where, for example, an accidental erasure preventing plug for write protection is disposed at a recording tape cartridge which does not have a WORM function, and in the present first embodiment, is effectively used in the WORM-type cartridge which does not require a write protect function. Note that the corner portion 12B is the position where a memory board is set in a recording tape cartridge which does not have a WORM function.

The above-described second memory board 42 stores WORM managing information so that the recording tape cartridge 10 exhibits the above-described WORM function. In the present first embodiment, information that the present recording tape cartridge 10 has a WORM function, and the place of the recording region where data is written at the magnetic tape T in a case in which data has been written at the magnetic tape T, and the range and the number of times of playback in a case in which data recorded at the magnetic tape T has been played back, are stored in the second memory board 42. Further, the second memory board 42 stores new write permitting information, which permits the recording of data onto unused portions of the magnetic tape T, and stores write prohibiting information expressing that the writing of data to recording regions at which data has already been written on the magnetic tape T is prohibited (the new write permitting information with respect to portions which are already written is converted into write prohibiting information and stored).

When the information, which is stored in the second memory board 42 and expresses that the recording tape cartridge 10 has a WORM function, is read at the drive device by the reading/writing device 48, the write prohibiting information stored in the first memory board 38 is ignored. In this way, in a case in which the recording tape cartridge 10 is loaded in a drive device which has the reading/writing device 48, the recording tape cartridge 10 is used on the basis of command signals which are inputted to the drive device within the range of the constraints of the WORM function (recording of data onto the magnetic tape T or playback of data recorded on the magnetic tape T is carried out).

At the second memory board 42, the method for writing information is different than at the first memory board 38. In this way, at a reading driver (a reader) and a writing driver (a writer) which correspond to the first memory board 38, information stored at the second memory board 42 cannot be read and information cannot be written (rewritten) to the second memory board 42. Namely, security of the second memory board 42 is set to be high at the first memory board 38.

To summarize the above, the recording tape cartridge 10 has the first memory board 38 and the second memory board 42, and exhibits a WORM function. A drive device which corresponds to the recording tape cartridge 10 has the two reading/writing devices 46, 48, and carries out writing of data to the magnetic tape T of the recording tape cartridge 10 within the range of the constraints of the WORM function, or carries out playback of data recorded on the magnetic tape T. In a case in which a recording tape cartridge which does not have the second memory board 42 (i.e., which does not carry out communication with the reading/writing device 48) is loaded in the drive device, the drive device is set so as to not write data to the magnetic tape of that recording tape cartridge.

In a drive device which does not have the reading/writing device 48, data can absolutely not be written to the magnetic tape T, due to the write prohibiting information which is stored in the first memory board 38 of the recording tape cartridge 10. Further, in the present first embodiment, the servo signal which is recorded in advance at the magnetic tape T is different than the servo signal of a recording tape cartridge which does not correspond to the WORM function. In this way, at the recording tape cartridge 10, even if a write prohibiting signal were not stored in the first memory board 38, data could not be written to the magnetic tape T in a drive device which did not correspond to the WORM function.

Next, operation of the present first embodiment will be described.

At the recording tape cartridge 10 of the above-described structure, when the recording tape cartridge 10 is not being used, the door 18 closes the opening 16 due to the urging force of the coil spring 32. In a case in which the magnetic tape T of the recording tape cartridge 10 is unused, no writing history, written regions, or playback history are stored in the second memory board 42.

When the recording tape cartridge 10 is loaded into a drive device which does not have the reading/writing device 48, the drive device reads the write prohibiting information of the first memory board 38 by the reading/writing device 46, and recognizes that information cannot be written to the recording tape cartridge 10. Then, the drive device automatically ejects the recording tape cartridge 10. In this way, even if data were already recorded on the magnetic tape T, this data could be prevented from being erased. Further, it is also possible to prevent data, which has a relatively low degree of importance and essentially should not be recorded, from being recorded on the magnetic tape T of the recording tape cartridge 10 having the WORM function.

When the recording tape cartridge 10 is loaded into a drive device which has both of the reading/writing devices 46, 48, at the drive device, the write prohibiting information of the first memory board 38 is read by the reading/writing device 46, and the signal of the second memory board 42 expressing that the cartridge has a WORM function is read by the reading/writing device 48. Thus, this drive device ignores the write prohibiting information, and carries out processings based on processing commands. If the processing command is to record data onto the magnetic tape T, the drive device writes data based on the command to the magnetic tape T.

Before the information of the first and second memory boards are read by the reading/writing devices 46, 48, due to the operation of loading the recording tape cartridge 10 into the drive device, the operation portion 18A of the door 18 is pushed rearward, the opening 16 is thereby opened, and the recording tape cartridge 10 is positioned within the drive device in this state. Then, the leader pin 20 is guided to a take-up reel of the drive device, and the take-up reel is rotated and driven simultaneously with the reel 14. In this way, while the magnetic tape T is successively pulled-out from the case 12 through the opening 16, data is written to (recorded on) the magnetic tape T by a recording head disposed along a predetermined tape path.

Then, the drive devices stores, in the second memory board 42 and by the reading/writing device 48, the fact that data has been written on the magnetic tape T and the range (regions) at which the data has been written on the magnetic tape T. The data managing information for managing data which is recorded on or is to be recorded on the magnetic tape T, is appropriately stored or updated in the first memory board 38.

Thereafter, when recording regions into which data can be written remain at the magnetic tape T, the recording tape cartridge functions as an additional-write recording tape cartridge which permits recording of data only at the remaining recording regions and allows playback of the recorded data. On the other hand, when no recording regions where data can be recorded remain at the magnetic tape T, the recording tape cartridge 10 functions as a read-only recording tape cartridge which permits only playback of recorded data.

When data recorded on the magnetic tape T is to be played-back, the recording tape cartridge 10 is loaded into a drive device, and in the same way as the above-described case of recording, the magnetic tape T is successively pulled-out from the case 12, and the data recorded on the magnetic tape is read and played-back by a playback head disposed along the predetermined tape path. Note that the drive device may be provided within both a data recording function and a playback function with respect to the magnetic tape T, or may be a record-only or a playback-only device.

When data recorded on the magnetic tape T is to be rewritten, the WORM managing information stored in the second memory board 42 must be changed. Namely, for example, if the recording tape cartridge 10 is not a WORM-type cartridge, the drive device is made to recognize that fact. Or, if the recording tape cartridge 10 is a WORM-type cartridge but data is not written in the recording regions which are to be rewritten. Thus, a person maliciously altering the data will change the WORM managing information of the second memory board 42 in order to make the drive device recognize this.

Here, the second memory board 42 which stores the WORM managing information is structured as a device which is separate from the first memory board 38. Therefore, the second memory board 42 can be set to a higher level of security than the first memory board 38. In this way, the security of the WORM managing information stored in the second memory board 42 improves, and it is difficult to change or additionally write the WORM managing information. Accordingly, it is also difficult to tamper with the data recorded on the magnetic tape T.

Even if an attempt is made to tamper with the data recorded on the magnetic tape T by a drive device not corresponding to the WORM function, because the write prohibiting information is stored in the first memory board 38, the operation of writing data to the magnetic tape T is prohibited. Further, the servo signal of the magnetic tape T is different than the servo signal of a magnetic tape which does not correspond to the WORM function. Therefore, even if the information of the first memory board 38 is changed and the write prohibiting information deleted, and the drive device attempts to write data on the magnetic tape T, the falsified data is not written to the magnetic tape T.

In this way, in the recording tape cartridge 10 relating to the present first embodiment, the maintainability of data recorded on the magnetic tape T can be improved.

Further, in the recording tape cartridge 10, the first and second memory boards 38, 42, which communicate in a non-contact manner with the reading/writing devices 46, 48 of the drive device respectively, are disposed at the different corner portions 12B, 12C in the case 12. In other words, the first and second memory boards 38, 42 are disposed so as to be separated from one another more greatly than their communication distances with the reading/writing devices 46, 48. Therefore, the respective communications can be prevented from crossing.

Second Embodiment

Next, a second embodiment of the present invention will be described. Note that parts and portions which are basically the same as those of the above-described first embodiment are denoted by the same reference numerals as in the first embodiment, and description thereof is omitted.

Figure 4:
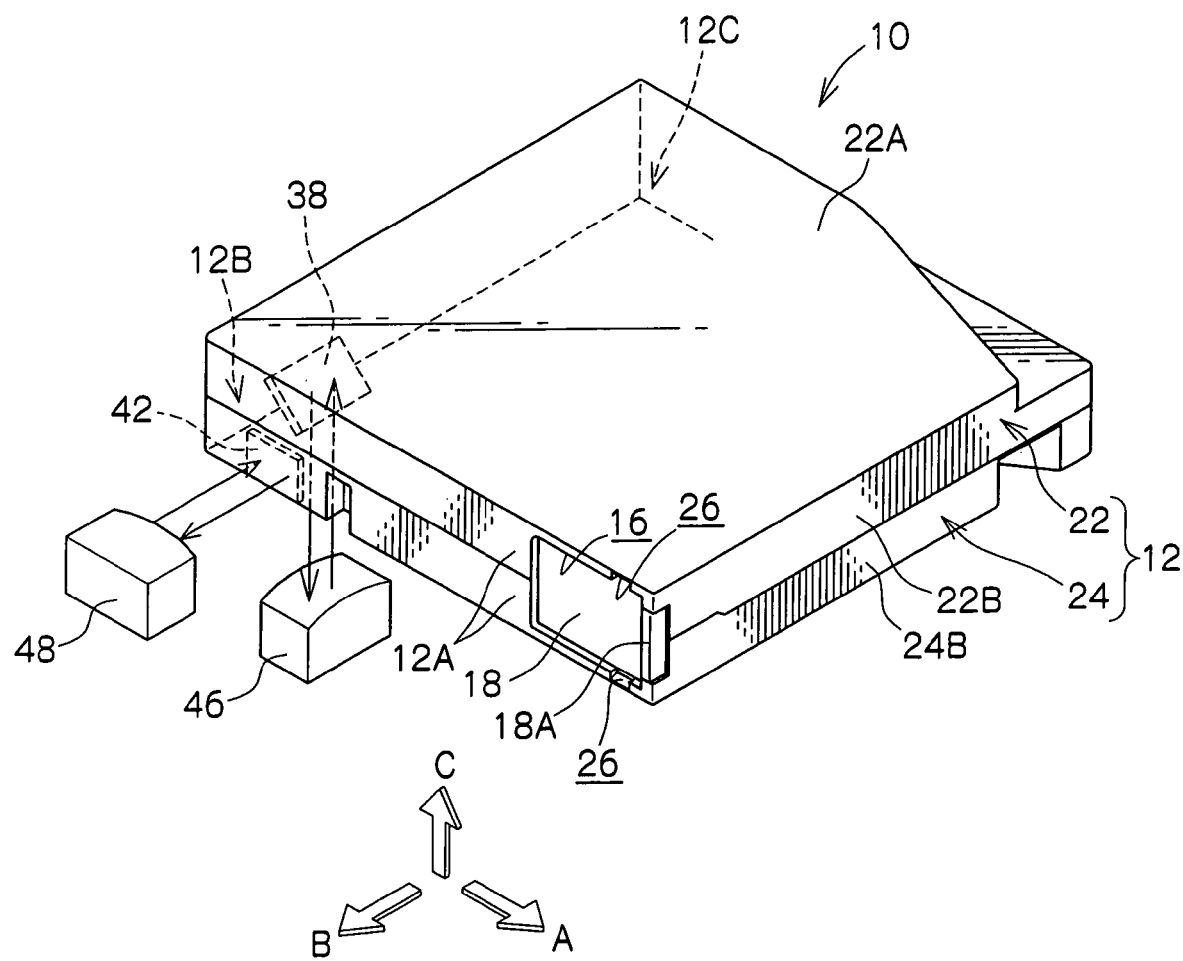
FIG. 4 is a perspective view schematically illustrating a state of communication, with a drive device, of a recording tape cartridge relating to a second embodiment of the present invention.

A recording tape cartridge 50, which serves as a recording medium cartridge relating to a second embodiment of the present invention, is shown in perspective view in FIG. 4. As shown in FIG. 4, the recording tape cartridge 50 differs from the recording tape cartridge 10 relating to the first embodiment with respect to the point that the second memory board 42 is disposed, together with the first memory board 38, at the rear right corner portion 12B in the case 12.

The second memory board 42 is disposed along the right side wall 12A such that the surface of the second memory board 42, at which surface the antenna is set, faces the inner surface of the right side wall 12A (is oriented outward toward the right). The second memory board 42 is held at the case 12 by being disposed in a groove portion or between wall portions or the like (not shown). In this way, the second memory board 42 is structured so as to, with respect to the reading/writing device 48 which is positioned at the right side of the case 12 within the drive device for example, carry out communication toward the right in a non-contact state, such that the drive device can read information or the drive device can write (including update) information. Further, also at a library device for example, with respect to a reading device (not shown) which is positioned at the right side of the case 12, the second memory board 42 carries out communication rearward in a non-contact state such that the library device can read information.

Other structures of the recording tape cartridge 50 are the same as those of the recording tape cartridge 10. Accordingly, with respect to the maintainability of the data recorded on the magnetic tape T, the recording tape cartridge 50 relating to the present second embodiment functions exactly the same as the recording tape cartridge 10, and achieves similar operational effects as the recording tape cartridge 10.

Further, in the recording tape cartridge 50, the direction in which the first memory board 38 communicates with the reading/writing device 46 (i.e., downward), and the direction in which the second memory board 42 communicates with the reading/writing device 48 (i.e., rightward) are different. Therefore, crossing of communications does not arise even if the first memory board 38 and the second memory board 42 are positioned close to one another. In this way, for example, the rear left corner portion 12C of the case 12 can be utilized for another application. For example, displaying the absence/presence of a history of writing data on the magnetic tape T (i.e., whether or not the recording tape cartridge 10 is unused) in order to show the write-protect state which has been switched-to by the accidental erasure preventing plug (i.e., whether or not data can be written to the magnetic tape T), or the like can be thought of as the other application.

Note that it suffices for the communication direction of the second memory board 42 to be different than the communication direction of the first memory board 38, and the communication directions may be set in accordance with the communication directions required by drive devices and library devices.

Third Embodiment

Figure 5:
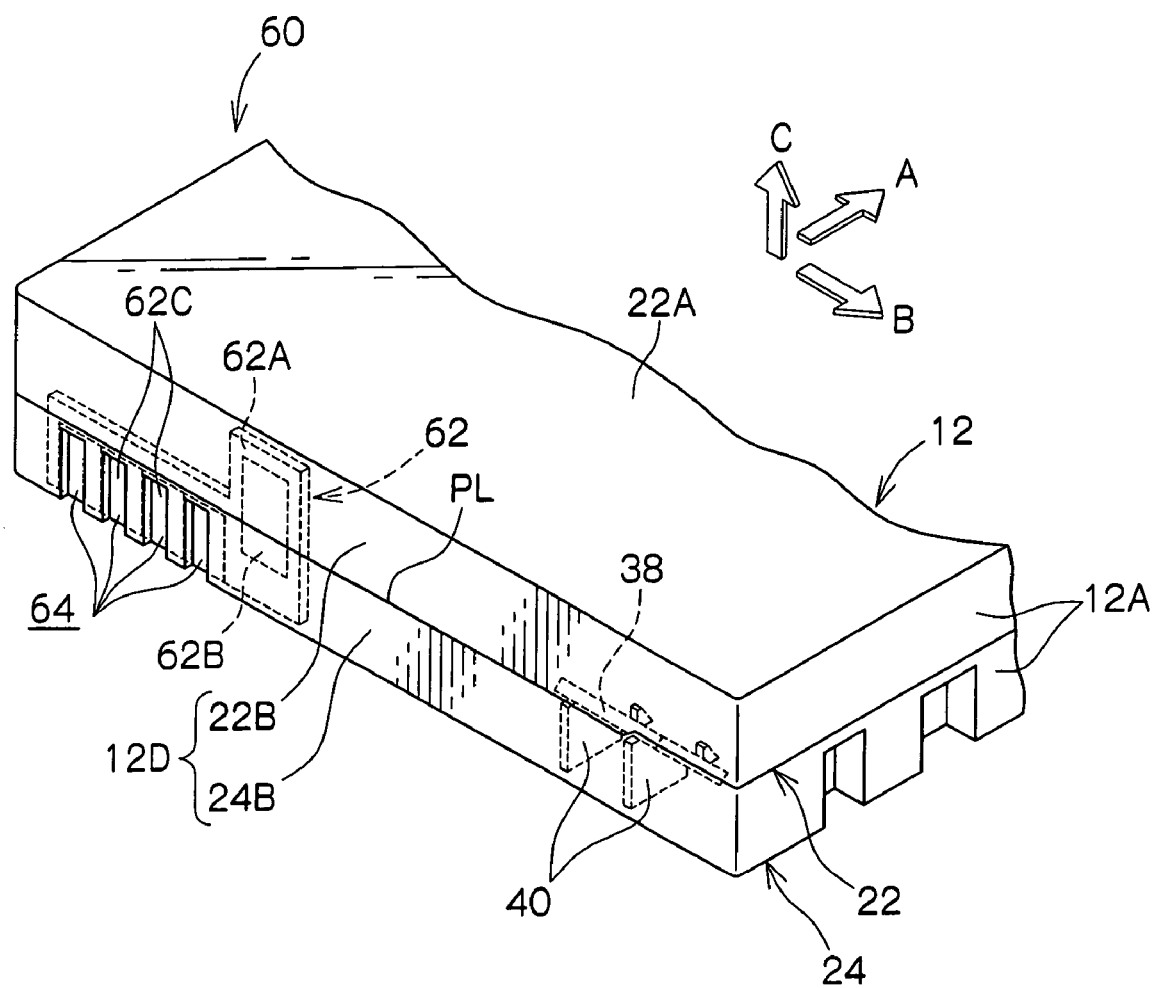
FIG. 5 is a perspective view showing portions of a recording tape cartridge relating to a third embodiment of the present invention.

The rear portion of a recording tape cartridge 60 relating to a third embodiment of the present invention is shown in perspective view in FIG. 5. As shown in FIG. 5, the recording tape cartridge 60 differs from the recording tape cartridge 10 relating to the first embodiment with respect to the point that the recording tape cartridge 60 has a second memory board 62 which stores WORM managing information, instead of the second memory board 42.

Figure 6:
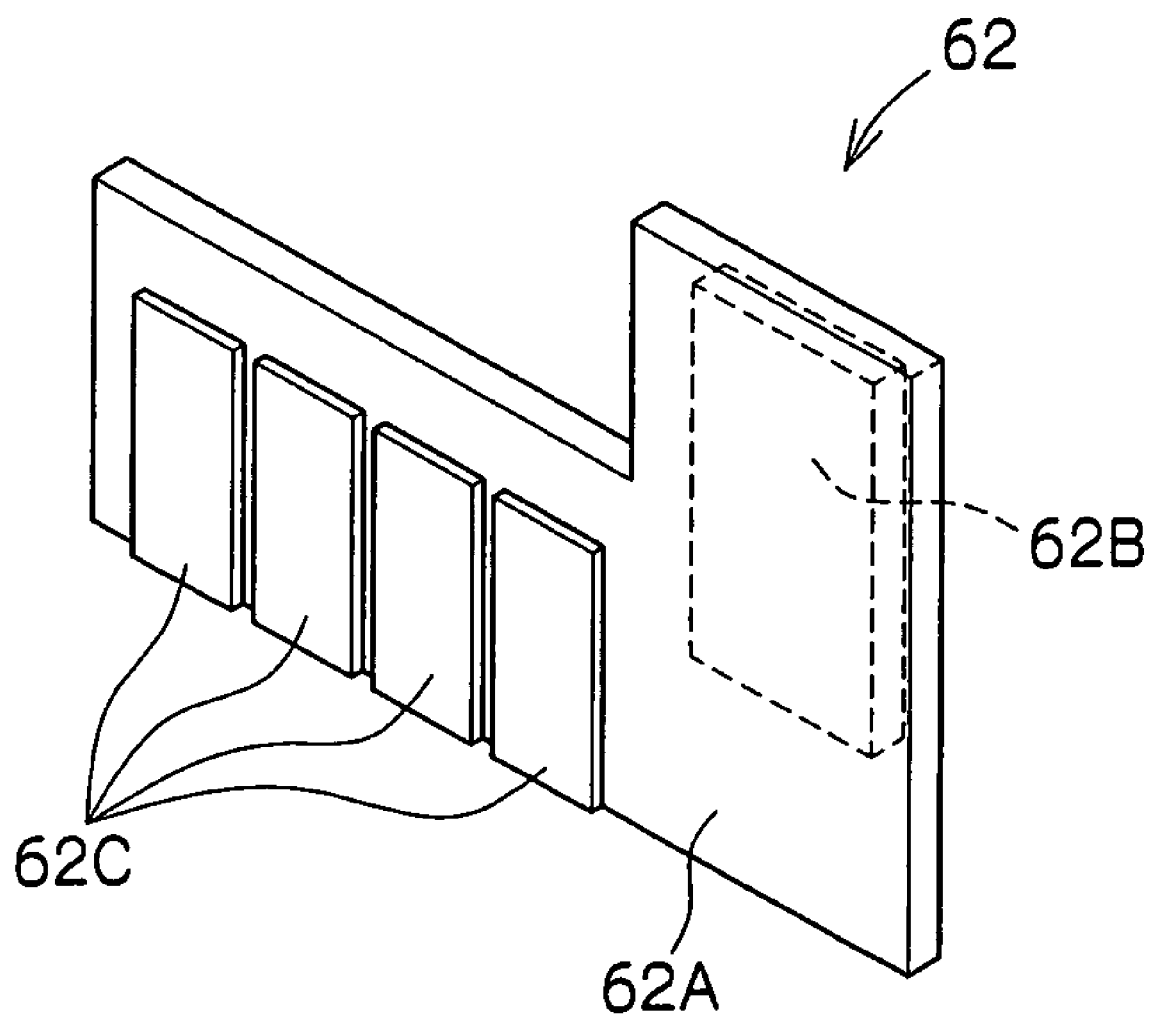
FIG. 6 is a perspective view of a second memory board structuring the recording tape cartridge relating to the third embodiment of the present invention.
Figure 7:
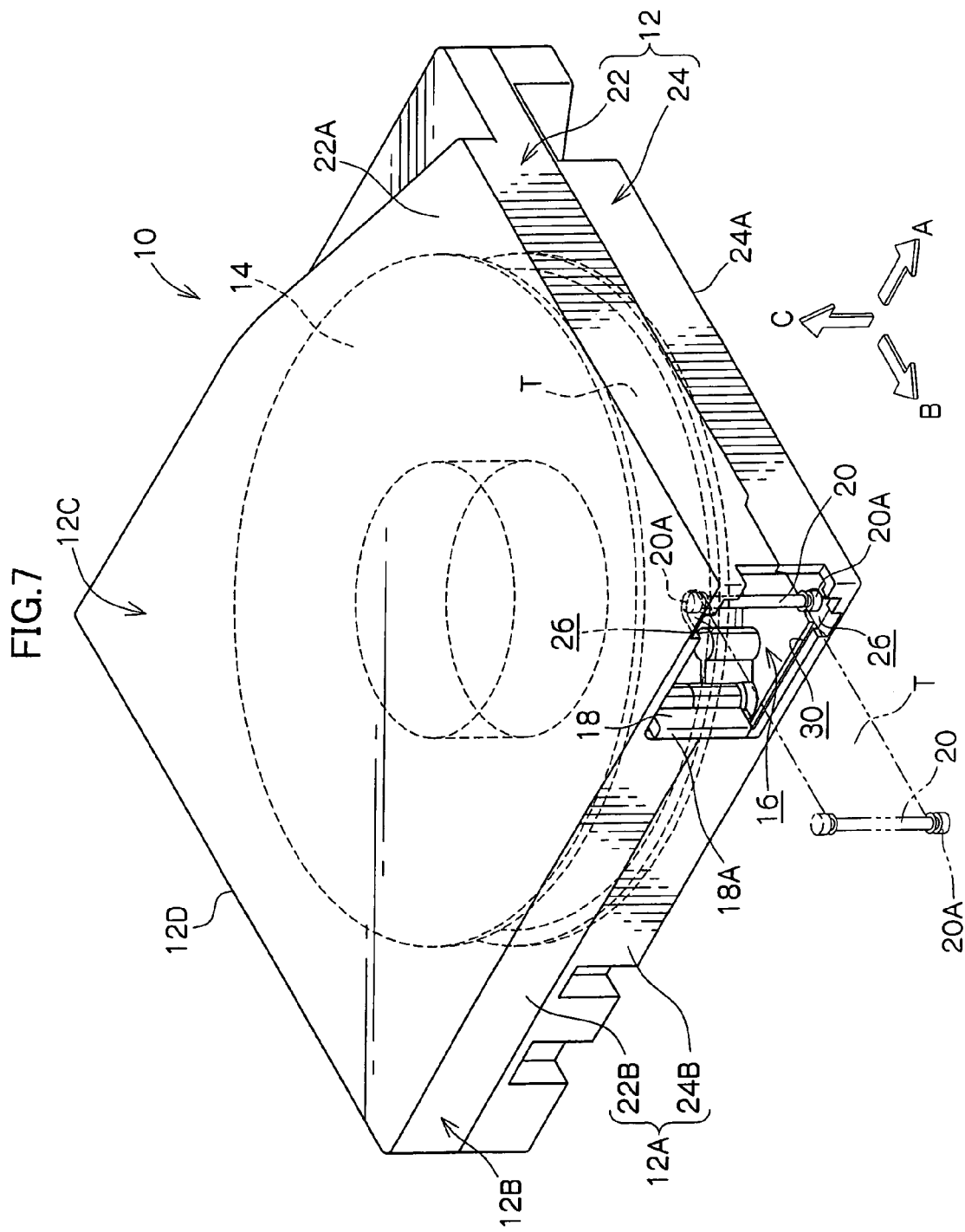
FIG. 7 is a perspective view showing the overall structure of a recording tape cartridge relating to a fourth embodiment of the present invention.

As shown in FIG. 6, the second memory board 62 is structured such that an IC chip 62B is provided on the front surface of a substantially L-shaped substrate 62A, and a plurality (four in the present third embodiment) of terminals 62C are provided at the reverse surface of the substrate 62A. The second memory board 62 is structured such that a drive device can read information or a drive device can write (including update) information, by communication carried out by a reading/writing device (not shown), which the drive device has in place of the reading/writing device 48, electrically contacting the terminals 62C. Therefore, terminal windows 64, for exposing the terminals 62C such that they can be contacted by the reading/writing device, are formed in the case 12.

A plurality of the terminal windows 64 are provided so as to independently expose the respective terminals 62C, at the lower portion of a rear wall 12D which is the rearward facing portion of the peripheral wall of the case 12, i.e., at the left end portion of the peripheral wall 24B structuring the rear wall 12D. In this way, offset of the contact positions between the respective terminals 62C and the terminals of the reading/writing device is prevented. The second memory board 62 is disposed in the corner portion 12C of the case 12 along the inner surface of the rear wall 12D, such that the respective terminals 62C are exposed from the corresponding terminal windows 64. In this state, the IC chip 62B is positioned so as to extend over a parting line PL of the case 12, which is the abutting ends of the upper case 22 (the peripheral wall 22B) and the lower case 24 (the peripheral wall 24B).

Namely, the second memory board 62 is disposed within the case 12 so as to straddle the parting line PL, and the lower portion of the second memory board 62 is fixed to the lower case 24, and the upper portion of the second memory board 62 is fixed to the upper case 22. For example, ultrasonic welding, caulking, adhesion, or the like can be used as the methods of fixing here. When the upper case 22 and the lower case 24 are separated in four, the second memory board 62, which is fixed to the upper case 22 and the lower case 24 in this way, breaks and (the information stored in) the IC chip 62B is destroyed.

Other structures of the recording tape cartridge 60 are the same as those of the recording tape cartridge 10. Accordingly, with respect to the maintainability of the data recorded on the magnetic tape T, the recording tape cartridge 60 relating to the present third embodiment functions exactly the same as the recording tape cartridge 10, and achieves similar operational effects as the recording tape cartridge 10.

Further, in the recording tape cartridge 60, because the second memory board 62 is a contact-type board, no crossing arises with the communications carried out by the first memory board 38. Therefore, the second memory board 62 can be disposed near to the first memory board 38 without considering the communication directions thereof, and the degrees of freedom in placement of the second memory board 62 increase. Namely, the second memory board 62 is not limited to the structure of being disposed at the corner portion 12C of the case 12, and can be placed at a desired position in accordance with the requirements of the drive device. Further, because the second memory board 62 is less expensive than the non-contact-type memory board 42, the recording tape cartridge 60 which has a WORM function can be structured at a low cost.

Because the second memory board 62 is destroyed when the case 12 is disassembled, even if the security of rewriting the information of the second memory board 62 is not made to be high, the maintainability of the data recorded on the magnetic tape T can be improved. Namely, when a person maliciously tampering with the data separates the upper case 22 and the lower case 24 in an attempt to change the information stored at the second memory board 62, at least the IC chip 62B is destroyed, and the information stored in the IC chip 62B is lost. Thus, at a drive device corresponding to the WORM function, the reading/writing device which is supposed to communicate with the second memory board 62 cannot carry out communication, and writing of data onto the magnetic tape T is denied. On the other hand, in a drive device which does not correspond to the WORM function, writing of data to the magnetic tape T is denied due to the write prohibiting information of the first memory board 38 or the difference with the servo signal of the magnetic tape T.

When a user erroneously disassembles the case 12, further erroneous overwriting of data on the magnetic tape T is prevented in the same way as in the above-described case of malicious tampering with the data. In this case, the recording tape cartridge 60 can be reused by the user returning it to the manufacturer (and requesting repair thereof).

Fourth Embodiment

Next, a recording tape cartridge 10, which serves as a recording medium cartridge relating to a fourth embodiment of the present invention, will be described on the basis of FIGS. 7 through 10. Note that elements which are the same as those of the first embodiment are denoted by the same reference numerals, and description thereof is omitted.

In the same way as in the first embodiment, the recording tape cartridge 10 is structured as a so-called WORM-type recording tape cartridge in which data cannot be overwritten on recording regions of the magnetic tape T where data is already written (data is already recorded), i.e., after the recording of data one time on the magnetic tape T, the recording tape cartridge functions as an additional-write or a read-only recording medium cartridge. Therefore, the above-described memory board 38 also stores WORM managing information for the recording tape cartridge 10 to exhibit the above-described WORM function.

In the present fourth embodiment, information expressing that the present recording tape cartridge 10 has a WORM function, and the places of the recording regions where data is written at the magnetic tape T in a case in which data has been written at the magnetic tape T, and the range or the number of times of playback in a case in which the data recorded on the magnetic tape T has been played-back, and the like are stored in the memory board 38. The present recording tape cartridge 10 is structured (set) such that, at a drive device which reads from the memory board 38 the information that there is a WORM function and the information of the regions where data is already recorded, overwriting of data with respect to the regions where data is already recorded at the magnetic tape T is prohibited.

Figure 8:
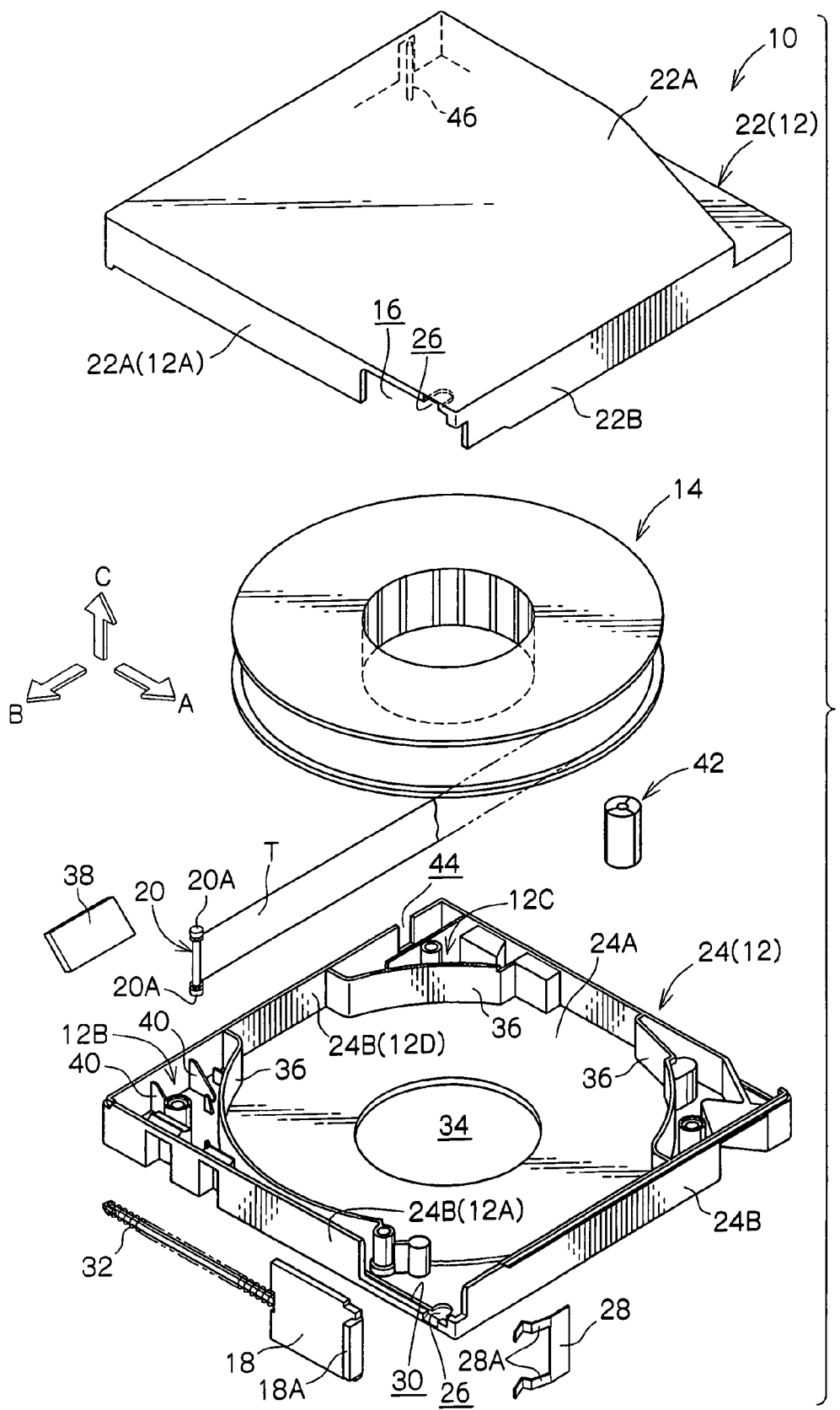
FIG. 8 is an exploded perspective view of the recording tape cartridge relating to the fourth embodiment of the present invention.
Figure 10:
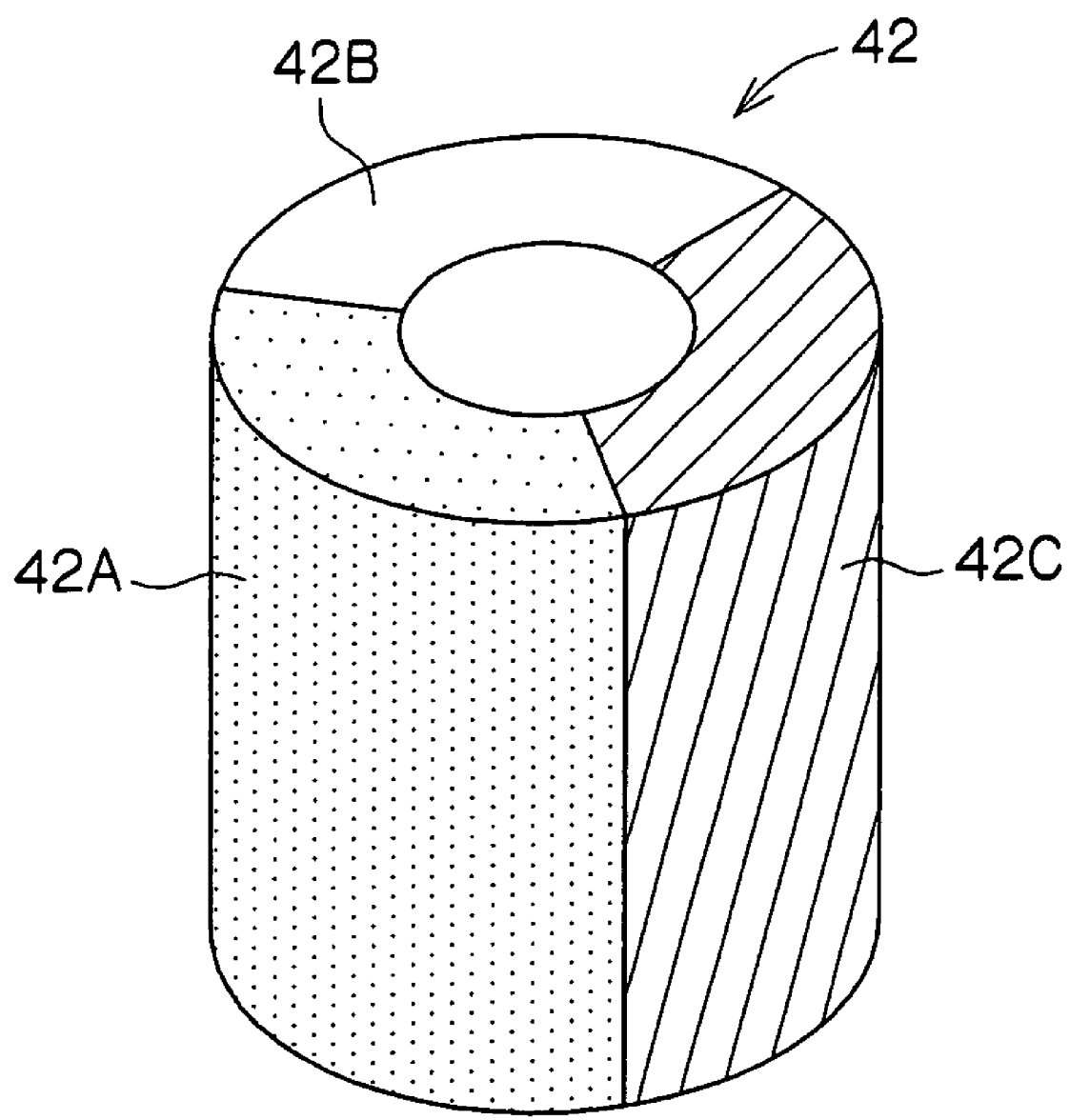
FIG. 10 is a perspective view showing a switching member structuring the recording tape cartridge relating to the fourth embodiment of the present invention.

As shown in FIG. 8, the recording tape cartridge 10 has a switching member 142 which structures the switching mechanism of the present invention. The switching member 142 is formed substantially in the shape of a cylindrical tube, and the outer peripheral surface thereof is sectioned into three regions at uniform intervals in the peripheral direction. In the present fourth embodiment, as shown in FIG. 10, the outer peripheral surface of the switching member 142 is sectioned into a first indicating portion 142A corresponding to a first state, a second indicating portion 142B corresponding to a second state, and a third indicating portion 142C corresponding to a third state, and these sections are respectively different colors. For example, the first indicating portion 142A is black, the second indicating portion 142B is white, and the third indicating portion 142C is red.

Figure 9A:
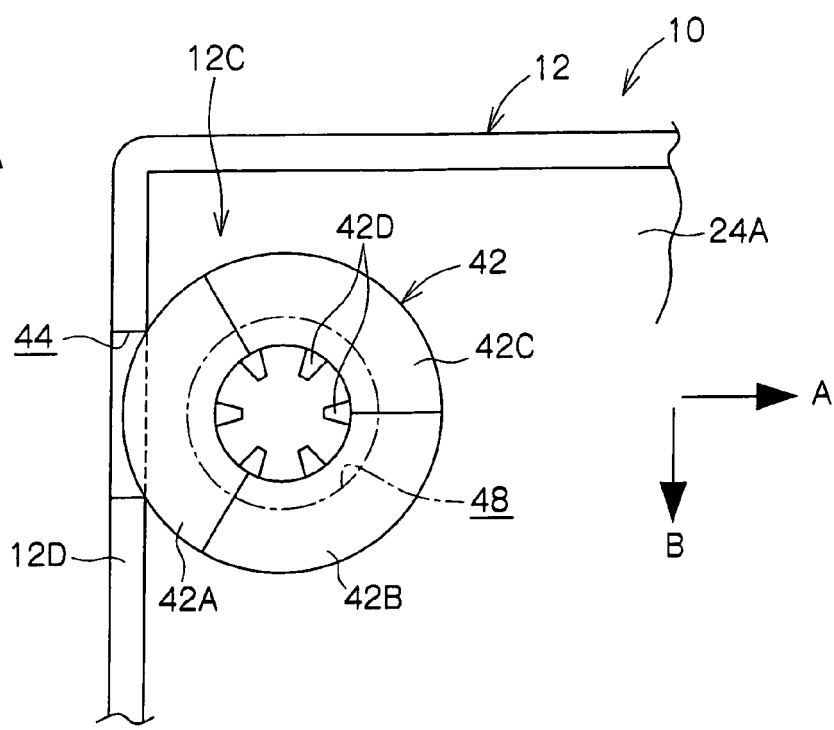
FIG. 9A is a plan view, as seen with a ceiling plate removed, showing main portions of the recording tape cartridge relating to the fourth embodiment of the present invention.
Figure 9B:
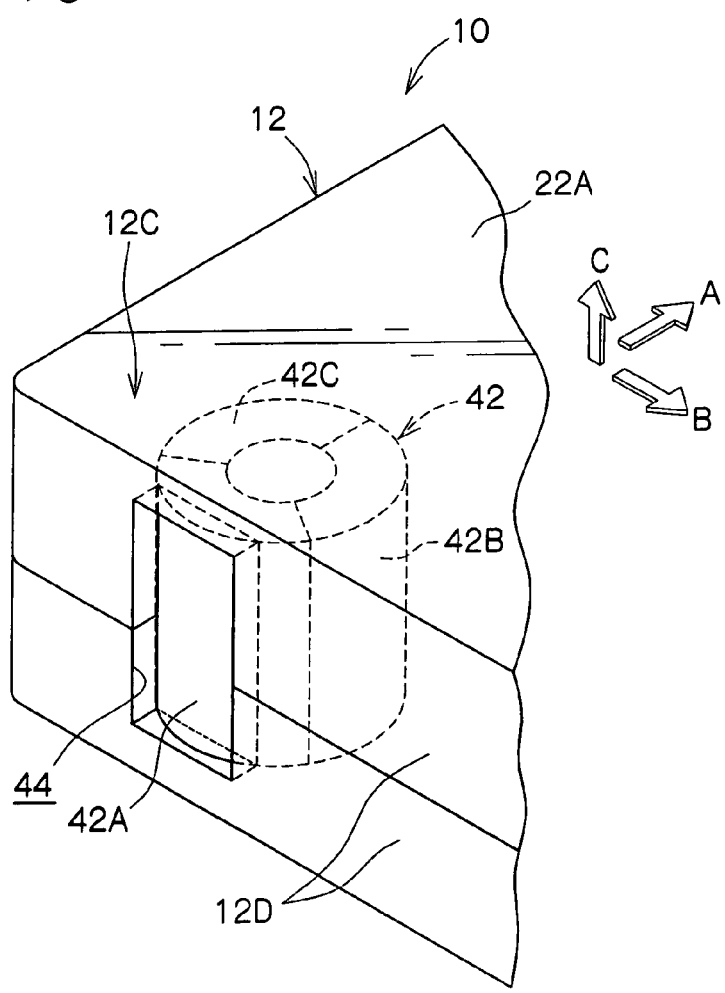
FIG. 9B is a perspective view, as seen with the ceiling plate removed, showing main portions of the recording tape cartridge relating to the fourth embodiment of the present invention.

As shown in FIGS. 9A and 9B, the switching member 142 is disposed at the left rear corner portion 12C in the case 12. Only one of the first indicating portion 142A, the second indicating portion 142B, and the third indicating portion 142C is exposed to the exterior of the case 12 from an indication window 144 provided in the rear wall 12D which is the rearward-facing peripheral wall structuring the case 12. Concretely, the switching member 142 is supported, so as to be rotatable with respect to the case 12, by a supporting shaft 46 (see FIG. 8) which stands erect from the ceiling plate 22A. Due to the switching member 142 rotating around the supporting shaft 46, the indicating portion (142A through 142C) which shows from the indication window 144 is switched.

An operation window 148 is formed in the floor plate 24A at the axially-central portion of the switching member 142. A switching mechanism of a drive device, which enters into the case 12 from this operation window 142, rotates a predetermined angle while engaging with engaging claws 142D provided at the axially central lower portion of the switching member 142. In this way, the switching member 142 rotates around the supporting shaft 46, and the indicating portion (142A through 142C) which shows from the indication window 144 is switched by the drive device.

At the time when the recording tape cartridge 10 is being shipped, i.e., when the magnetic tape T is in an unused state, only the first indicating portion 142A of the switching member 142 is shown from the indication window 144. Further, when the recording tape cartridge 10 is loaded into a drive device and data is written on the magnetic tape T, the switching member 142 is rotated a predetermined angle (120°) around the supporting shaft 46 by the drive device, such that the second indicating portion 142B is exposed from the indication window 144. Moreover, when the recording tape cartridge 10 is loaded into a drive device and data written on the magnetic tape T is read, the switching member 142 is further rotated a predetermined angle (120°) around the supporting shaft 46 by the drive device, such that the third indicating portion 142C is exposed from the indication window 144.

As described above, the recording tape cartridge 10 is structured such that, if the black first indicating portion 142A can be seen from the indication window 144, it can be known that data has not yet been written on the magnetic tape T. Further, the recording tape cartridge 10 is structured such that, if the white indicating portion 142B can be seen from the indication window 144, it can be known that regions in which data is written exist at the magnetic tape T but there is no reading history for that data. Moreover, the recording tape cartridge 10 is structured such that, if the red indicating portion 142C can be seen from the indication window 144, it can be known that there is a reading history of data which is written at the magnetic tape T.

Although not illustrated, a detent providing portion is provided between the switching member 142 and the case 12. The detent providing portion maintains the state in which one of the indicating portions (142A through 142C) of the switching member 142 is exposed, and permits switching of the indication when torque which exceeds the holding force is applied to the switching member 142 from the switching mechanism of the drive device. The detent providing portion can be structured by, for example, a spring portion formed integrally with the case 12 by resin molding, and an engaging portion which is provided at the switching member 142 and engages with the spring portion of the case 12 due to rotation around the supporting shaft 46. Further, a stopper is provided between the switching member 142 and the case 12, so that there is no direct switching from the state in which the first indicating portion 142A is exposed to the state in which the third indicating portion 142C is exposed. Note that the detent providing portion may be structured by a ratchet mechanism or the like so that the switching member 142 does not rotate reversely.

Operation of the present fourth embodiment will be described next.

In the recording tape cartridge 10 of the above-described structure, when the recording tape cartridge 10 is not being used, the door 18 closes the opening 16 due to the urging force of the coil spring 32, in the same way as in the first embodiment. When the magnetic tape T of the recording tape cartridge 10 has not been used, the black first indicating portion 142A is exposed from the indication window 144 of the case 12, and the user can recognize from the exterior that the recording tape cartridge 10 is unused.

When the recording tape cartridge 10 is loaded into a drive device in order to write data to the magnetic tape T, the drive device reads the information of the memory board 38, and determines whether or not it is possible to write data to the magnetic tape T. Namely, when it is judged that the magnetic tape T is unused or that there exist unused regions in a case in which there is data which has already been written, the data for which writing is requested is written to the magnetic tape T, and the fact that data has been written on the magnetic tape T and the recording region where the data is written at the magnetic tape T are written in the memory board 38 (i.e., the WORM managing information is updated).

Note that, before information is written to the magnetic tape T, due to the operation of loading the recording tape cartridge 10 into the drive device, the operation portion 18A of the door 18 is pushed rearward, the opening 16 is thereby opened, and the recording tape cartridge 10 is positioned within the drive device in this state. Then, the leader pin 20 is guided to the take-up reel of the drive device, and the take-up reel is rotated and driven simultaneously with the reel 14. In this way, while the magnetic tape T is successively pulled-out from the case 12 through the opening 16, data is written to (recorded on) the magnetic tape T by a recording head disposed along a predetermined tape path.

When the drive device writes the data on the magnetic tape T, the drive device rotates the switching member 142 by 120° by the switching mechanism, such that the indicating portion shown from the indication window is switched to the second indicating portion 142B. At the recording tape cartridge 10 which is ejected from the drive device, the second indicating portion 142B is exposed from the indication window 144, and the user can recognize from the exterior that there exist at the magnetic tape T regions where data is written, but this data does not have a history of having been read.

The recording tape cartridge 10, at which there is a history of writing data on the magnetic tape T in this way, functions as an additional-write recording tape cartridge in which, when there remain recording regions at which data can be written at the magnetic tape T, recording of data only at the remaining recording regions is permitted and the recorded data can be played-back. On the other hand, when no recording regions at which recording of data is possible remain at the magnetic tape T, the recording tape cartridge 10 functions as a read-only recording tape cartridge which permits only playback of recorded data.

When the data recorded on the magnetic tape T is to be read, the recording tape cartridge 10 is loaded into a drive device, or the state in which the recording tape cartridge 10 is loaded in the drive device which wrote the data to the magnetic tape T is maintained, and, in the same way as in the above-described case of writing, the magnetic tape T is successively pulled-out from the case 12, and the data recorded on the magnetic tape is read by a playback head disposed along the predetermined tape path. Further, the drive device writes, in the memory board 38, that the data written on the magnetic tape T has been read, and the recording regions which have been read (i.e., updates the WORM managing information). After this data reading, the drive device rotates the switching member 142 by 120° by the switching mechanism, and switches the indicating portion shown from the indication window 144 to the third indicating portion 142C. At the recording tape cartridge 10 which is ejected from the drive device, the third indicating portion 142C is exposed from the indication window 144, and the user can recognize from the exterior that the data written at the magnetic tape T has a reading history.

As described above, there is provided the switching member whose rotational position with respect to the case 12 is switched among three states in accordance with the absence/presence of writing of data on the magnetic tape T and the absence/presence of a reading history of data written on the magnetic tape T, so that the user can visually distinguish the switched state. Therefore, from the exterior of the recording tape cartridge 10, the user can recognize whether or not data has been written on the magnetic tape T, and when data has been written, whether or not the data has a reading history. In particular, because the respective indicating portions 142A through 142C are structured to have different colors, the user can easily recognize the absence/presence of writing of data on the magnetic tape T, and the absence/presence of a reading history of written data (the state of the data of the magnetic tape T).

In this way, the recording tape cartridge 10 relating to the present embodiment has a WORM function, and the user can be made to recognize the absence/presence of writing of data on the magnetic tape T and the absence/presence of a reading history of data. Further, a plurality of the recording tape cartridges 10 can be easily classified or the like per state of the data of the magnetic tape T.

The operation of switching the switching member 142 is carried out by the drive device which writes the data on the magnetic tape T or the drive device which reads the data written on the magnetic tape T. Therefore, the absence/presence of writing of data on the magnetic tape T and the absence/presence of a reading history of the data, which the switching member 142 indicates, reliably coincide with the actual state of the magnetic tape T. Namely, there is no fear of erroneous operation or the like, as would be a concern in the case in which the user operates the switching member 142, and the reliability of indication of the state of the magnetic tape T by the switching member is good.

Note that, in the present fourth embodiment, an example is described in which the colors of the respective indicating portions 142A, 142B, 142C are changed. However, the present invention is not limited to the same. For example, the state of the magnetic tape T may be expressed by characters or symbols or the like. Or, as another example, the state of the magnetic tape T may be expressed by combinations thereof (including combinations of colors).

Fifth Embodiment

Next, the recording tape cartridge 50 relating to a fifth embodiment of the present invention will be described on the basis of FIGS. 11, 12A and 12B. Note that parts and portions which are basically the same as those of the above-described first embodiment are denoted by the same reference numerals as in the first embodiment, and description thereof is omitted.

Figure 11:
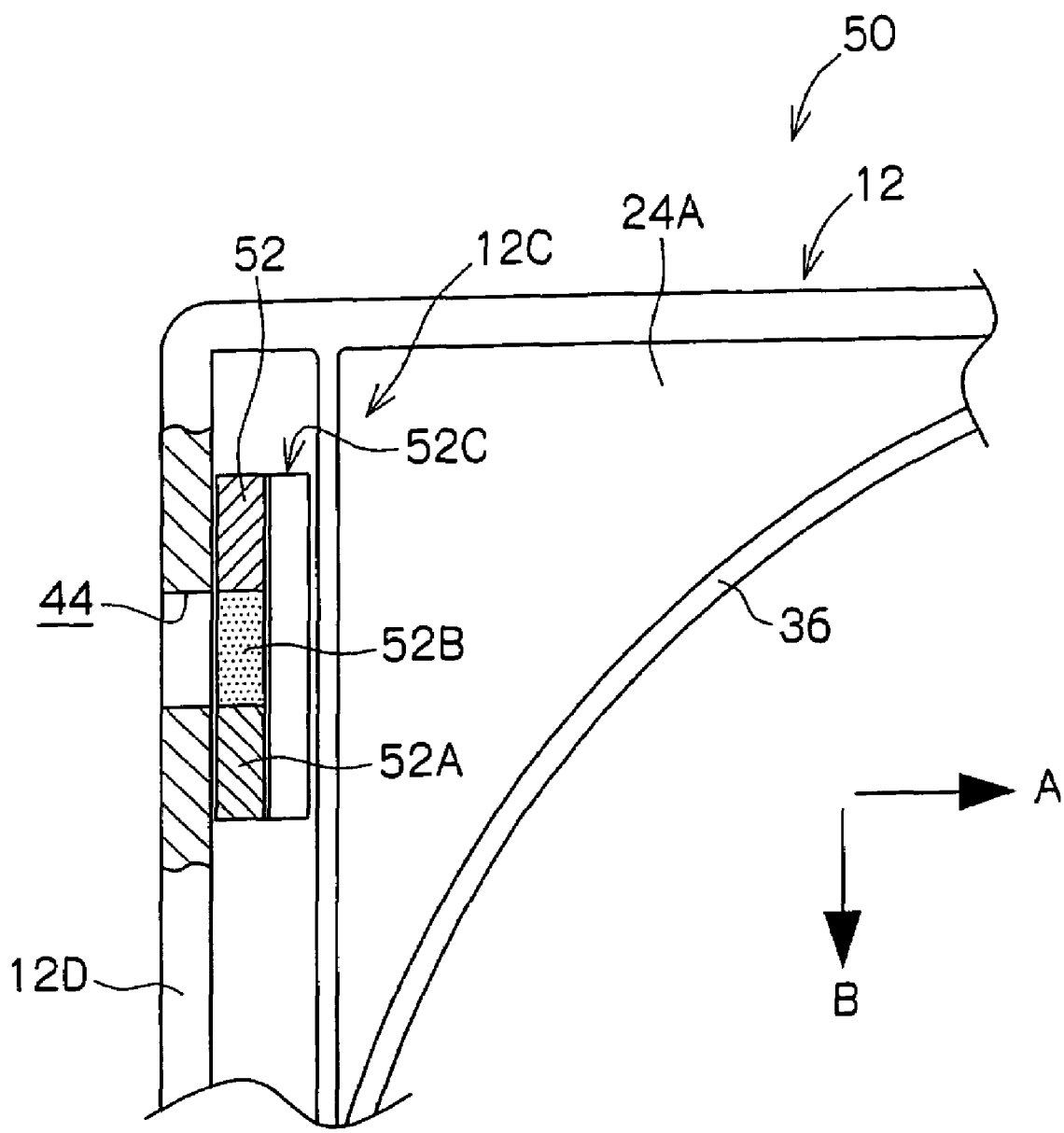
FIG. 11 is a plan view, as seen with a portion being cut-away, showing main portions of a recording tape cartridge relating to a fifth embodiment of the present invention.

Main portions of the recording tape cartridge 50, which is provided with a switching member 52 instead of the switching member 142, are shown in a schematic plan view in FIG. 11. As shown in FIG. 11, the switching member 52 is formed substantially in the shape of a rectangular, flat plate, and can slide along the inner surface of the rear wall 12D at the corner portion 12C of the case 12. The switching member 52 is sectioned into three regions at uniform intervals along the left-right direction, which is the direction of the aforementioned sliding. In the present fifth embodiment, the switching member 52 is sectioned into a first indicating portion 52A corresponding to a first state, a second indicating portion 52B corresponding to a second state, and a third indicating portion 52C corresponding to a third state, in that order from the right. These portions have respectively different colors. For example, the first indicating portion 52A is black, the second indicating portion 52B is white, and the third indicating portion 52C is red.

Only one of the first indicating portion 52A, the second indicating portion 52B, and the third indicating portion 52C is exposed to the exterior of the case 12 from the indication window 144 of the case 12. Due to the switching member 52 sliding as mentioned above, the indicating portion (52A through 52C) which is exposed from the indication window 144 is switched. A guide wall 54, which impedes front-back direction movement of the switching member 52 and rotation of the switching member 52 along a horizontal plane between the rear wall 12D and the guide wall 54, is provided parallel to the rear wall 12D at the case 12, in order to guide the switching member 52 in the left-right direction.

As shown in FIG. 12A, an operation window 56, which is long in the left-right direction, is formed in the floor plate 24A beneath the switching member 52. An operation projection 52D, which projects out from the bottom end of the left portion (the third indicating portion 52C) of the switching member 52, is disposed in the operation window 56. A switching mechanism of a drive device, which enters into the case 12 from this operation window 56, moves the switching member 52 to the right by a predetermined amount while engaging with the operation projection 52D. Namely, the switching member 52 slides along the rear wall 12D by being operated by the drive device.

At the time when the recording tape cartridge 50 is being shipped, i.e., when the magnetic tape T is in an unused state, only the first indicating portion 52A of the switching member 52 is shown from the indication window 144. Further, when the recording tape cartridge 50 is loaded into a drive device and data is written on the magnetic tape T, the switching member 52 is slid to the right by a predetermined amount (one-third of the entire width thereof) by the drive device, such that the second indicating portion 52B is exposed from the indication window 144. Moreover, when the recording tape cartridge 50 is loaded into a drive device and data written on the magnetic tape T is read, the switching member 52 is slid to the right by a predetermined amount by the drive device, such that the third indicating portion 52C is exposed from the indication window 144.

In this way, the recording tape cartridge 50 is structured such that, if the black first indicating portion 52A can be seen from the indication window 144, it can be known that data has not yet been written on the magnetic tape T. Further, the recording tape cartridge 50 is structured such that, if the white indicating portion 52B can be seen from the indication window 144, it can be known that regions in which data is written exist at the magnetic tape T but there is no reading history for that data. Moreover, the recording tape cartridge 50 is structured such that, if the red indicating portion 52C can be seen from the indication window 144, it can be known that there is a reading history of data which is written at the magnetic tape T.

Although not illustrated, the recording tape cartridge 50 as well is provided with a detent providing portion and a stopper, between the switching member 52 and the case 12. The detent providing portion maintains the state in which one of the indicating portions (52A through 52C) of the switching member 52 is exposed, and permits switching of the indication when force which exceeds the holding force is applied to the operation projection 52D from the switching mechanism of the drive device. The stopper prevents the switching member 52 from moving to the right past the state in which the third indicating portion 52C is shown.

With the recording tape cartridge 50, the drive device also can be made to recognize the absence/presence of writing of data on the magnetic tape T and the absence/presence of a reading history of data written on the magnetic tape T, in accordance with the position of the switching member 52 with respect to the case 12. Concretely, as shown in FIG. 12B, a resistor 58, which is long in the left-right direction, is fixed to the floor plate 24A either further forward of or further rearward of the operation window 56. A conductive contact element 60, which is provided at the bottom end of the left portion of the switching member 52 which is non-conductive, slidingly contacts the resistor 58. The contact element 60 is electrically and mechanically connected to a first terminal 62 via a flexible wire 60A which is extendible. Further, the right end portion of the resistor 58 is electrically connected to a second terminal 64. The first terminal 62 and the second terminal 64 are exposed at the bottom surface of the case 12 (the outer surface of the floor plate 24A).

In this way, at the recording tape cartridge 50, as the switching member 52 slides to the right and the contact position of the contact element 60 at the resistor 58 moves toward the right, the electrical resistance value between the first terminal 62 and the second terminal 64 changes continuously (decreases in the present fifth embodiment). On the other hand, the drive device into which the recording tape cartridge 50 is loaded is provided with a tape state recognizing portion which applies voltage between the first terminal 62 and the second terminal 64, senses (a physical value corresponding to) the resistance value, and on the basis of this resistance value, recognizes the absence/presence of writing of data on the magnetic tape T and the absence/presence of a reading history of data written on the magnetic tape T. If a sensed electrical resistance value R is greater than a first threshold value R1, the tape state recognizing portion recognizes that data has not yet been written on the magnetic tape T. If the electrical resistance value R is less than or equal to the first threshold value R1 and greater than or equal to a second threshold value R2, the tape state recognizing portion recognizes that regions where data is written exist at the magnetic tape T but there is no reading history of that data. If the electrical resistance value R is less than the second threshold value R2, the tape state recognizing portion recognizes that there is a reading history of data which is written on the magnetic tape T. In other words, the threshold values R1, R2 are determined such that these recognitions coincide with the actual states of the magnetic tape T.

In the recording tape cartridge 50 which is structured as described above, the point of the user being made to recognize the absence/presence of writing of data on the magnetic tape T and the absence/presence of a reading history of data written on the magnetic tape T, is exactly the same as in the above-described fourth embodiment, except that the switching member 52 moves rectilinearly with respect to the case. Accordingly, the present recording tape cartridge 50 can achieve the exact same effects as the recording tape cartridge 10 relating to the fourth embodiment. Further, in the recording tape cartridge 50, the electrical resistance value between the two terminals 62, 64 is varied by changing the position of the switching member 52 with respect to the case 12. Therefore, a drive device as well can easily be made to recognize the absence/presence of writing of data on the magnetic tape T and the absence/presence of a reading history of data written on the magnetic tape T. Namely, if the drive device is structured to recognize the differences in the colors of the respective indicating portions, the drive device becomes very expensive. However, in this way, the drive device can be made to recognize the state of the magnetic tape T without the drive device becoming expensive. Further, it is possible to omit the storing of (at least some of) the WORM managing information in the memory board 38.

The above-described fifth embodiment is structured such that both the color of the portion of the switching member 52 exposed from the indication window 144 and the electrical resistance value R between the first and second terminals 62, 64 are varied. However, the present invention is not limited to the same, and, for example, it is possible to switch only one of the electrical resistance value R and the colors (in the same way as in the fourth embodiment, the indicating portions 52A through 52C may be characters or symbols or the like).

Further, the above-described fifth embodiment is structured such that the electrical resistance value R is changed in accordance with the position of the switching member 52, but the present invention is not limited to the same. Another physical value which can be easily detected, such as electrostatic capacity or the like for example, may be varied. Moreover, it is also possible to add the function of varying the electrical resistance value R or the electrostatic capacity or the like to the recording tape cartridge 10 relating to the fourth embodiment.

Sixth Embodiment

Next, a recording tape cartridge 70 relating to a sixth embodiment of the present invention will be described on the basis of FIG. 13. Note that parts and portions which are basically the same as those of the above-described first embodiment are denoted by the same reference numerals as in the first embodiment, and description thereof is omitted.

Figure 13:
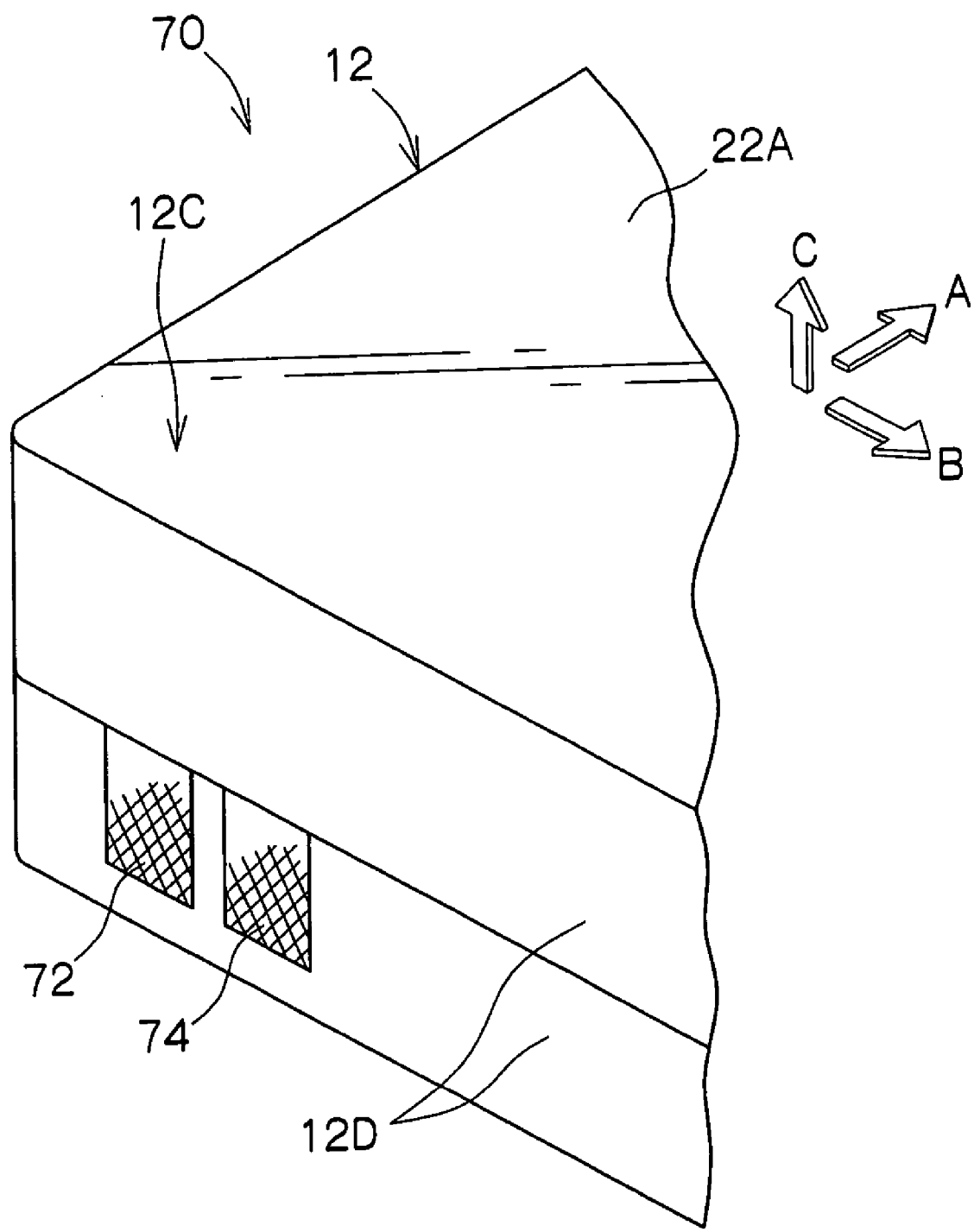
FIG. 13 is a perspective view showing main portions of a recording tape cartridge relating to a sixth embodiment of the present invention.

The rear left portion of the recording tape cartridge 70 is illustrated in perspective view in FIG. 13. As shown in FIG. 13, the recording tape cartridge 70 is structured such that a pair of indicating portions 72, 74 are provided at the rear wall 12D, instead of the indication window 144 which shows the respective indicating portions of the switching member 142. The indicating portions 72, 74 are each structured by a material whose color changes irreversibly (the color-changed state thereof is maintained permanently) when heated to a predetermined temperature or more. In the present sixth embodiment, the indicating portions 72, 74 are structured by, for example, applying an irreversible thermochromic ink such as a non-reversible thermochromic flexo ink or the like, onto the outer surface of the rear wall 12D, or by embedding, in the rear wall 12D, members at which such a material is covered by a transparent covering material. In this way, the contents indicated by the indicating portions 72, 74 can be recognized mainly by the user. Note that, if the indicating portions 72, 74 are structured, for example, such that even the absence/presence of light transmission thereat is changed before and after the color change (heating), the contents indicated by the indicating portions 72, 74 can be easily recognized by both the user and a drive device.

In the recording tape cartridge 70, the indicating portion 72 indicates the absence/presence of writing of data on the magnetic tape T, and the indicating portion 74 indicates the absence/presence of a reading history of data written on the magnetic tape T. Concretely, the color of the indicating portion 72 before heating (e.g., black) corresponds to the state in which data is not written on the magnetic tape T, and the color thereof after heating (e.g., red) corresponds to the state in which there are recording regions where data is written on the magnetic tape T. On the other hand, the color of the indicating portion 74 before heating (e.g., black) corresponds to the state in which there is no reading history of the data written on the magnetic tape T, and the color thereof after heating (e.g., red) corresponds to the state in which there is a reading history of the data written on the magnetic tape T. In this way, in the recording tape cartridge 70 relating to the present sixth embodiment, by switching between the two states of the two indicating portions 72, 74, which are the different colors thereof before and after heating, the absence/presence of recording of data on the magnetic tape T and the absence/presence of reading of the data can be corresponded to, and the states of the magnetic tape T can be expressed digitally.

When the drive device in which the recording tape cartridge 70 is loaded writes data to the magnetic tape T, the drive device heats the indicating portion 72 by a compact heater or the like so as to change the color of the indicating portion 72. Further, the drive device which reads data written on the magnetic tape T heats the indicating portion 74 so as to change the color of the indicating portion 74.

In this way, the recording tape cartridge 70 relating to the present sixth embodiment as well has a WORM function, and can cause a user to recognize the absence/presence of writing of data on the magnetic tape and the absence/presence of a reading history of data. In particular, by using a structure in which the light transmittances of the respective indicating portions 72, 74 change (from transparent to non-transparent, or vice-versa) before and after heating, a drive device can easily be made to recognize the absence/presence of writing of data on the magnetic tape T and the absence/presence of a reading history of data. Namely, by using a physical value, such as the amount of transmitted light, which both a user and a drive device can directly recognize, there is no need to take measures such as changing both the indicated color and the electrical resistance value, or the like. Further, the drive device can change the colors of the indicating portions 72, 74 in a non-contact manner. Moreover, in accordance with the present structure, storing of (at least some of) the WORM managing information at the memory board 38 can be omitted. In addition, if the colors of the indicating portion 72 and/or the indicating portion 74 before and after heating are respectively made to be colors which are different than the case 12, the user can be made to recognize that the recording tape cartridge 70 is a WORM-type cartridge, before using it.

Note that the second memory board 42 in the above-described first and second embodiments may be structured so as to be fixed to the upper case 22 and the lower case 24 and destroyed due to disassembly of the case 12. Further, as another structure of disassembling the second memory boards 42, 62 due to disassembly of the case 12, for example, a structure may be used in which the second memory board 42 or the like is fixed to the lower case 24, and the distal end of a hook provided at the upper case is made to enter in between the floor plate 24A and the second memory board 42 or the like, or into a hole provided in the second memory board 42 or the like, or the like. The present invention is not limited by the absence/presence of or the structure of the function of disassembling the second memory board 42, 62 due to the disassembly of the case 12.

The first memory board 38 is a non-contact-type memory in each of the above-described embodiments, but the present invention is not limited to the same. For example, the first memory board 38 may be structured as a contact-type memory, in the same way as the second memory board 62. Namely, the first and second memory devices in the present invention may both be contact-type memories. Or, the first memory board may be structured by a contact-type memory, and the second memory board may be structured by a non-contact-type memory.

In the respective embodiments described above, examples are described in which the first and second memory boards 38, 42, 62 are disposed at the rear portion of the case 12, but the present invention is not limited to the same. For example, either of or both of the first and second memory boards 38, 42 may be disposed at the front portion of the case 12. Further, the present invention is not limited to a structure in which the case 12 is formed in a substantially rectangular shape (has corner portions) as seen in plan view.

Although the state of the magnetic tape T is indicated by changing the colors of the indicating portions 72, 74 in the above-described sixth embodiment, the present invention is not limited to the same. For example, the present invention may be structured such that the states of the magnetic tape T are expressed digitally by the positions of two members which can be selectively disposed at two positions, or by physical values (the electrical resistance values or the like) which correspond to these positions.

The above-described fourth through sixth embodiments are structured such that the drive device changes the states of the switching members 142, 52 and the indicating portions 72, 74, but the present invention is not limited to the same. For example, the states of the switching members 142, 52 and the indicating portions 72, 74 may be changed by, for example, the user, or a library device which reads the information of the memory board 38, or the like.

Each of the above-described first through sixth embodiments is an example of a structure in which the single reel 14, around which is wound the magnetic tape T serving as the recording medium, is accommodated within the case 12. However, the present invention is not limited to the same.

For example, a disk medium which is formed in the shape of a disc, such as an optical disk, a magneto-optical disk, a magnetic disk, or the like, may be used as the recording medium. Or, a structure may be employed in which two reels, which are for the drawing-out and the taking-up of a recording tape such as a magnetic tape or the like, are accommodated within the case. Accordingly, the configuration and the structure of the case 12 as well can be made to correspond to the specifications and the like of the recording medium housed therein and of the drive device into which the recording medium cartridge is loaded, and are not limited to the configurations and structures relating to the above-described embodiments.

What is claimed is:

1. A recording medium cartridge accommodating a recording medium within a case, and preventing data from being overwritten onto a recording region of the recording medium where data is already written, the recording medium cartridge comprising:
   a first memory device provided within the case and storing information for managing the data written at the recording medium; and
   a second memory device provided within the case and storing information for managing writing of data to the recording medium.

2. The recording medium cartridge of claim 1, wherein the first memory device and the second memory device carry out reading or writing of information by non-contact-type communication processing with a memory reading portion or memory writing portion of a drive device, and
   the first memory device and the second memory device are disposed at different corner portions within the case.

3. The recording medium cartridge of claim 2, wherein the second memory device is destroyed when the case is disassembled.

4. The recording medium cartridge of claim 1, wherein the first memory device and the second memory device carry out reading or writing of information by non-contact-type communication processing with a memory reading portion or memory writing portion of a drive device, and
   a direction of communication of the first memory device and a direction of communication of the second memory device are different directions.

5. The recording medium cartridge of claim 4, wherein the second memory device is destroyed when the case is disassembled.

6. The recording medium cartridge of claim 1, wherein one of the first memory device and the second memory device carries out reading or writing of information by communication processing carried out by electrical contact with a memory reading portion or a memory writing portion of a drive device.

7. The recording medium cartridge of claim 6, wherein the second memory device is destroyed when the case is disassembled.

8. The recording medium cartridge of claim 1, wherein the second memory device is destroyed when the case is disassembled.

* * * * *